United States Patent
Murakami et al.

(10) Patent No.: US 6,213,737 B1
(45) Date of Patent: Apr. 10, 2001

(54) DAMPER DEVICE AND TURBOMOLECULAR PUMP WITH DAMPER DEVICE

(75) Inventors: Chikara Murakami, Tokyo; Ichiju Satoh, Fujisawa, both of (JP)

(73) Assignee: Ebara Corporation, Tokyo (JP)

(*) Notice: Subject to any disclaimer, the term of this patent is extended or adjusted under 35 U.S.C. 154(b) by 0 days.

(21) Appl. No.: 09/075,593

(22) Filed: Apr. 16, 1998

(30) Foreign Application Priority Data

| Apr. 18, 1997 | (JP) | 9-116291 |
| Aug. 27, 1997 | (JP) | 9-246045 |
| Dec. 2, 1997 | (JP) | 9-347130 |

(51) Int. Cl.⁷ ............... F04B 17/03; G05B 5/01
(52) U.S. Cl. .............. 417/423.4; 417/423.12; 318/611; 310/90.5
(58) Field of Search ............... 318/611, 128; 310/90.5, 93; 415/90, 170 R; 73/430; 244/1 SA; 417/352, 413.1, 423.4, 423.12; 335/229, 215; 188/378; 358/128

(56) References Cited

U.S. PATENT DOCUMENTS

| 3,601,641 | * | 8/1971 | Baermann | 310/93 |
| 3,637,169 | * | 1/1972 | Tossman et al. | 244/1 SA |
| 4,100,576 | * | 7/1978 | Ditthardt | 358/128 |
| 4,198,863 | * | 4/1980 | Bartek et al. | 73/430 |
| 4,517,505 | * | 5/1985 | Cunningham | 318/611 |
| 4,541,772 | * | 9/1985 | Becker | 415/90 |
| 4,579,508 | * | 4/1986 | Tsumaki et al. | 415/170 R |
| 4,609,332 | * | 9/1986 | Miki et al. | 417/352 |
| 4,620,752 | | 11/1986 | Fremerey et al. | |
| 4,845,450 | * | 7/1989 | Porzio et al. | 335/215 |
| 4,946,345 | * | 8/1990 | Watanabe et al. | 415/90 |
| 5,059,092 | * | 10/1991 | Kabekitz et al. | 417/423.12 |
| 5,231,336 | * | 7/1993 | Van Namen | 318/128 |
| 5,374,160 | * | 12/1994 | Hablanian | 415/90 |
| 5,394,044 | * | 2/1995 | Yamamura | 310/90.5 |
| 5,599,174 | * | 2/1997 | Cook et al. | 417/413.1 |
| 5,652,473 | * | 7/1997 | Delamare | 310/90.5 |
| 5,772,395 | * | 6/1998 | Schofield | 415/90 |
| 5,896,076 | * | 4/1999 | Van Namen | 335/229 |
| 5,896,961 | * | 4/1999 | Aida et al. | 188/378 |
| 6,006,875 | * | 12/1999 | Van Namen | 188/378 |

FOREIGN PATENT DOCUMENTS 6-249290    9/1994   (JP).

* cited by examiner

Primary Examiner—Charles G. Freay
(74) Attorney, Agent, or Firm—Armstrong, Westerman, Hattori, McLeland & Naughton, LLP

(57) ABSTRACT

A damper device has a magnet and at least two yokes facing the magnet across gaps. The magnet and the two yokes jointly provide a magnetic circuit such that a magnetic flux flowing from a first magnetic pole of the magnet is divided across one of the gaps into magnetic fluxes which flow into entrance sides of the yokes and back from exit sides of the yokes across another of the gaps into a second magnetic pole of the magnet. The two yokes are mechanically connected rigidly to each other, and a spring means elastically holds the one of the gaps between the first magnetic pole and the entrance sides of the yokes. One of the magnet and the yokes is adapted to be connected to a vibratable member. When the gaps are differentially varied in length by vibration of the vibratable member, the divided magnetic fluxes are changed to generate eddy currents in the yokes and the magnetic poles.

10 Claims, 15 Drawing Sheets

$\xrightarrow{\phantom{xx}} \Delta\Phi$
$\dashrightarrow$ EDDY CURRENT

DAMPER DEVICE AND TURBOMOLECULAR PUMP WITH DAMPER DEVICE

BACKGROUND OF THE INVENTION

1. Field of the Invention

The present invention relates to a damper device and a turbomolecular pump having such a damper device, and more particularly to a damper mechanism for passively damping vibrations of a rotating member such as a rotating shaft of rotary machinery by consuming electromagnetic losses.

2. Description of the Prior Art

Damper devices which employ magnets have a long history, but much remains to be improved for preventing or damping vibrations with magnetic damper devices. When magnetic fluxes in magnetic materials are increased or reduced, they cause a hysteresis loss which is effective to damp vibrations. However, such a hysteresis loss has a small effect, and is effective to prevent or damp low-frequency vibrations only.

The effect of an eddy current loss only for preventing or damping vibrations will be described below. A damper device serves to convert vibration energy into thermal energy to damp applied vibrations. When a vibration is applied, it changes a magnetic flux distribution or density in an electric conductor or causes an electric conductor to cut a magnetic flux, resulting in an electromotive force generated in the electric conductor. The generated electromotive force occurs in a short-circuited loop in the electric conductor, which produces an eddy current I. If the short-circuited loop has a resistance R, then the electric conductor generates thermal energy represented by:

$$I^2 \cdot R$$

If the generated electromotive force is indicated by E, then the generated thermal energy may be expressed by:

$$E^2/R$$

Since the mechanical vibration energy is converted into thermal energy, the electric conductor operates as a vibration damper. In order to increase the efficiency of the vibration damper, it is necessary to increase the electromotive force E and reduce the resistance R.

One of the simplest forms of conventional vibration dampers is shown in FIG. 1 of the accompanying drawings. As shown in FIG. 1, the vibration damper comprises a magnet 1 and an electric conductor 2, one of which is fixed to a vibratable body and the other to a stationary body. The vibration damper damps vibrations applied thereto as follows: When the vibration damper is vibrated, the magnet 1 and the electric conductor 2 move relatively to each other in the directions indicated by the arrows, changing a magnetic flux path of magnetic flux Φ in the electric conductor 2 in accordance with the amplitude of the vibration. In other words, the electric conductor cuts the magnetic flux Φ, or magnetic flux density at an area of the electric conductor 2 near the magnet 1 changes its magnitude in proportion to the amplitude of the vibration. When the magnetic flux density is thus changed, the electric conductor 2 develops an alternating electromotive force proportional to the change in the magnetic flux density to cause eddy currents. Thermal energy converted from the mechanical vibration energy is proportional to the square of the magnetic flux density. In order to increase the magnetic flux density in the electric conductor 2, it is necessary to either bring the electric conductor 2 closely toward the magnet 1 or reduce a gap if the electric conductor 2 is placed in the gap. Since, in either case, the conductor portion where the magnetic flux density is large, is small and a current I flows perpendicularly to the magnetic flux density in the small conductor portion, the path of the current I is inevitably narrow, equivalently resulting in an increase in the equivalent resistance R. If the gap of the magnetic flux path is widened to increase the volume of the electric conductor 2 which is placed in the gap, then the magnetic flux density B is reduced.

In order to increase the efficiency of the damper device, the conductor portion where the eddy current flows should be increased to reduce the resistance R. If the electric conductor is placed in the gap of magnetic flux path, then the conductor portion in the gap serves as a neck for increase of the eddy current. If the neck is enlarged, then the gap is widened, resulting in an increased magnetic resistance and a reduction in the magnetic flux density. For this reason, it is not preferable to provide a gap in the magnetic flux path and place the electric conductor in the gap.

It follows from the above considerations that it is preferable to provide a plurality of magnetic flux paths for a conductor circuit to choose from freely, and employ a structure which allows the magnetic flux paths to change greatly due to applied vibration. Therefore, a damper device is required to be of such a structure that longer and shorter gaps are produced when the magnetic flux paths and magnet are relatively displaced by the applied vibration, changing the magnetic flux paths greatly.

Turbomolecular pumps have moving impeller blades that rotate at high speed to exhaust a gas for thereby developing a vacuum. Some single-axis-controlled turbomolecular pumps include passive stable radial magnetic bearings having permanent magnets and active axial magnetic bearings. These magnetic radial and axial bearings support a rotatable shaft out of contact therewith to make the turbomolecular pumps operable at high speed and also make them free from contamination with lubricating oil.

Although the rotary assembly of such turbomolecular pumps is stabilized against radial movement and coning movement under magnetic forces of the permanent magnets, any attenuation of vibration of the rotatable shaft is very small. It is therefore necessary to employ a high-performance radial damper device in order to allow the rotatable shaft supported by the magnetic bearings to rotate at high speed. It is preferable that turbomolecular pumps have two passive radial magnetic bearings including permanent magnets at axially different positions, and these passive radial magnetic bearings be combined with respective damper devices for damping radial vibrations thereof.

FIGS. 2(A) and 2(B) of the accompanying drawings shows a known damper device 26 for use with such a magnetic bearing. As shown in FIGS. 2(A) and 2(B), the damper device 26 is of a laminated structure comprising an axially alternate assembly of damping plates 26a of rubber and metal plates 26b. Because of the laminated structure, the damper device 26 is not axially displaceable, but is radially movable for absorbing vibrations applied in the radial direction of the damper device 26. In turbomolecular pump applications where rotatable axis is vertical, both upper and lower magnetic bearings are combined with such damper devices for radially damping vibrations applied to the rotatable shaft at the upper and lower magnetic bearings. The upper and lower magnetic bearings should be capable of sufficiently damping vibrations in a full range of rotational speeds even when the vibration mode of the rotatable shaft, including a rotor, varies.

The damper device 26 shown in FIGS. 2(A) and 2(B) has some shortcomings. The damping plates 26a of rubber have their stiffness and damping effect progressively reduced as the temperature rises. Rubber has static and dynamic stiffnesses different from each other such that the static stiffness is a fraction of the dynamic stiffness. If the dynamic stiffness of the damping plates 26a is set to a value effective for attenuating radial vibrations, then the static stiffness of the damping plates 26a will be of a considerably small value. As a result, turbomolecular pumps which incorporate the damper device 26 with such a dynamic stiffness setting cannot be used in horizontally oriented installations, since static stiffness may be small.

SUMMARY OF THE INVENTION

It is therefore an object of the present invention to provide a damper device which is of a relatively simple structure and is highly effective to damp vibrations, and a turbomolecular pump which has such a damper device.

Another object of the present invention is to provide a turbomolecular pump which has magnetic bearings combined with damper devices capable of stably supporting a rotatable shaft against vibrations at various different temperatures in different vibration modes.

According to the present invention, there is provided a damper device comprising a magnet having magnetic poles; at least two yokes facing said magnetic poles of said magnet across gaps; the magnet and the at least two yokes jointly providing a magnetic flux circuit such that a magnetic flux flowing from a first magnetic pole of the magnet is divided across one of the gaps into magnetic fluxes which flow into entrance sides of the yokes and back from exit sides of the yokes across another of the gaps into a second magnetic pole of the magnet; at least two yokes being mechanically connected rigidly to each other; and spring means elastically holding the gaps between the magnetic pole and the sides of the yokes; one of the magnet and the yokes being adapted to be connected to a vibratable member; whereby when the gaps are differentially varied in length by vibration of the vibratable member, the divided magnetic fluxes are also differentially changed to generate eddy currents in the yokes and the magnetic-poles.

According to the present invention, there is also provided a damper device comprising a ring-shaped magnet magnetized in an axial direction thereof; a pair of ring-shaped magnetic poles disposed on respective opposite ends of the ring-shaped magnet; a ring-shaped yoke disposed either within or around the ring-shaped magnet with a ring-shaped gap interposed therebetween, the ring-shaped yoke magnetically connecting the ring-shaped magnetic poles to each other; and spring means elastically holding the ring-shaped gap; one of the ring-shaped magnet and the ring-shaped yokes being adapted to be connected to a vibratable member; whereby when the ring-shaped gap is circumferentially varied in length by vibration of the vibratable member, a magnetic flux produced by the ring-shaped magnet is changed in path to generate eddy currents in the yokes and the magnetic poles.

According to the present invention, there is also provided a damper device comprising a ring-shaped magnet magnetized radially transversely to an axial direction thereof; a pair of ring-shaped magnetic poles disposed on respective opposite ends of the ring-shaped magnet; and a pair of ring-shaped yokes disposed in sandwiching relation to the ring-shaped magnet with a pair of respective ring-shaped gaps interposed therebetween, the ring-shaped yokes magnetically connecting the ring-shaped magnetic poles to each other; the ring-shaped magnet, the ring-shaped magnetic poles, and the ring-shaped yokes jointly providing a magnetic circuit such that a magnetic flux flowing from an N pole of the ring-shaped magnet through one of the magnetic poles is divided across the gaps into magnetic fluxes which flow into entrance sides of the yokes and back from exit sides of the yokes across the gaps into an S pole of the magnet through the other of the magnetic poles; the ring-shaped yokes being connected rigidly to each other; spring means elastically holding the ring-shaped gaps; one of the ring-shaped magnet and the ring-shaped yokes being adapted to be connected to a vibratable member which is vibratable in the axial direction; whereby when the ring-shaped gaps are differentially varied in length by vibration of the vibratable member, the divided magnetic fluxes are changed to generate eddy currents in the yokes and the magnetic poles.

Either the yoke or the magnet having magnetic poles is mounted on a rotatable position to damp vibrations of an apparatus, and the remainder is mounted on a stationary position, so that the spring means depends on stable spring characteristics of the apparatus.

According to the present invention, there is further provided a damper device comprising a magnet; a pair of magnetic poles fixed to the magnet; and at least a yoke having surfaces spaced from and facing the magnetic poles; the magnet, the magnetic poles, and the yokes jointly providing a looped magnetic flux circuit such that a magnetic flux produced by the magnet flows from one of the magnetic poles into the yoke, flows through the yoke, flows from the yoke into the other of the magnetic poles, and flows back into the magnet; whereby a change of the magnetic flux caused by a vibration-dependent change in the distance between the magnetic poles and the yoke causes eddy current loss therein, and said changed portion of said magnetic flux flows in the magnetic poles and the yoke outside of the magnet.

The magnetic poles or the yoke may have a cylindrical shape or a planar shape. They comprise a single member or a plurality of electrically insulated, parallel members. The cylindrical shaped member has a radius, or the planar shaped member has a thickness, which is about twice a skin depth $\delta$ determined by a frequency f to be damped, and a permeability and a conductivity of the magnetic poles or the yoke.

According to the present invention, there is provided a turbomolecular pump comprising a rotatable shaft having a plurality of impeller blades and a rotor portion of a motor mounted on the rotatable shaft; and radial and axial bearings for rotatably supporting the rotatable shaft wherein the radial bearings comprises two axially spaced passive magnetic bearings at least one having permanent magnets, and each of the passive magnetic bearings includes the following eddy current damper device for damping radial vibration.

The eddy current damper device may comprise a fixed member fixed to a stationary member, and a movable member axially immovable and radially movable, fixed to the stationary member of the passive magnetic bearings, and wherein one of the fixed member and the movable member comprises a permanent magnet and magnetic poles mounted thereon, and the other of the fixed member and the movable member comprises a yoke; whereby a magnetic flux produced by the permanent magnet generates eddy current loss in the yokes and magnetic poles by vibration of the vibratable member, a loop of magnetic fluxes is formed out of the permanent magnet.

According to the present invention, there is also provided a turbomolecular pump comprising a rotatable shaft, having impeller blades and a rotor portion of a motor including a rotor mounted on the rotatable shaft; and a plurality of bearings for rotatably supporting the rotatable shaft, wherein the bearings includes radial passive magnetic bearings each having permanent magnets, and each of the passive magnetic bearings includes an eddy current damper device for damping radial vibration.

The above and other objects, features, and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

1st Embodiment

Figure 1:
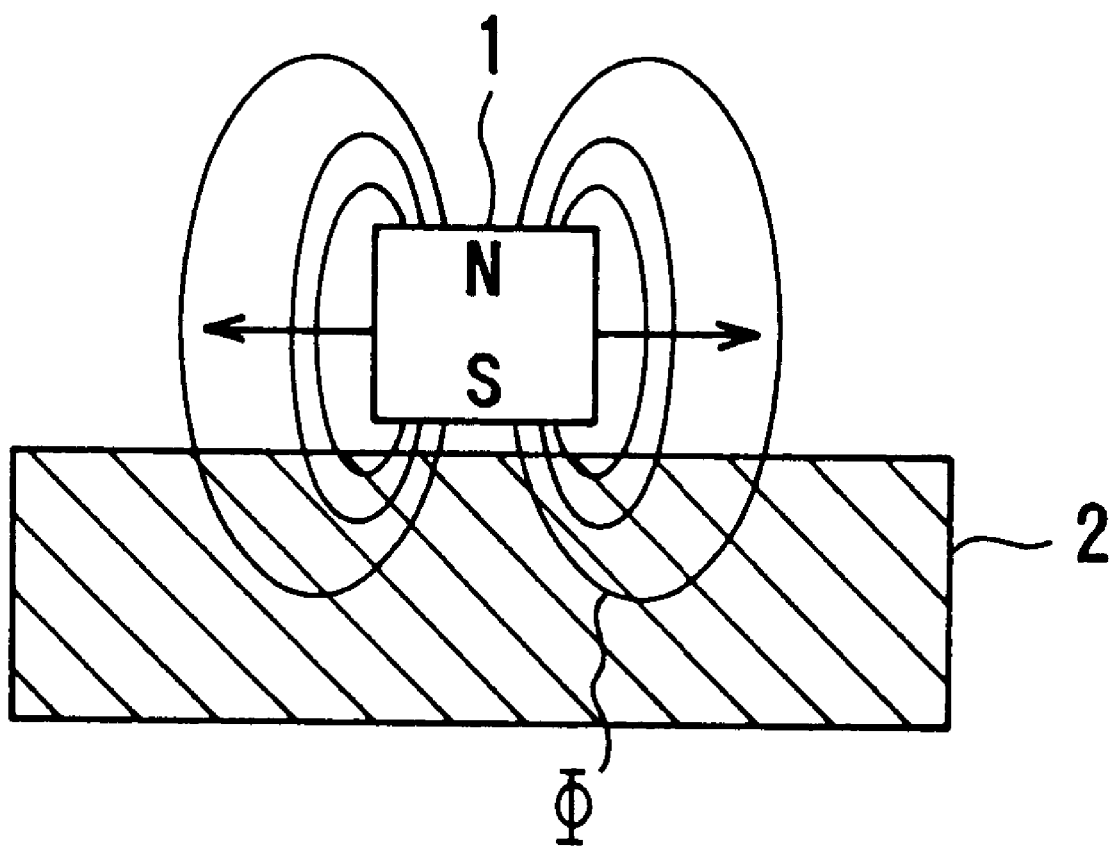
FIG. 1 is a cross-sectional view of a conventional damper device.
Figure 2A:
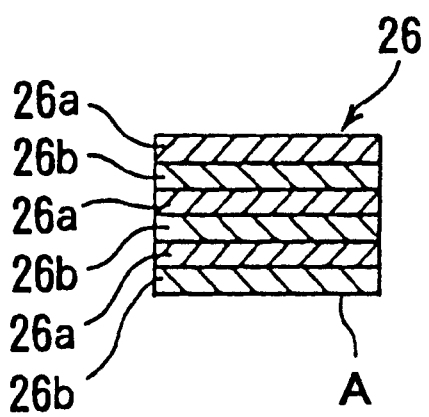
FIGS. 2(A) and 2(B) are cross-sectional views of a conventional laminated rubber damper device, FIG. 2(A) showing the conventional laminated rubber damper device which is free of radial displacement, and FIG. 2(B) showing the conventional laminated rubber damper device which is radially displaced.
Figure 2B:
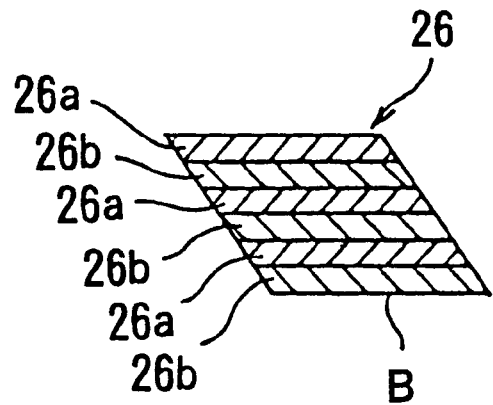
Figure 3A:
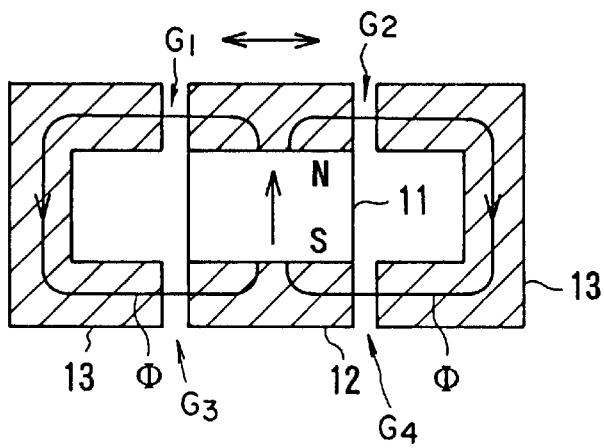
FIGS. 3(A), 3(B), and 3(C) are cross-sectional views of a damper device according to a first embodiment of the present invention, the views showing different operational positions of the damper device.
Figure 3D:
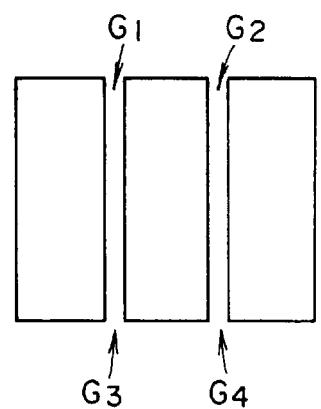
FIGS. 3(D), 3(E), and 3(F) are schematic views showing circulatory fluxes and electromotive forces in the damper device in the respective operational positions shown in FIGS. 3(A), 3(B), and 3(C)
Figure 3B:
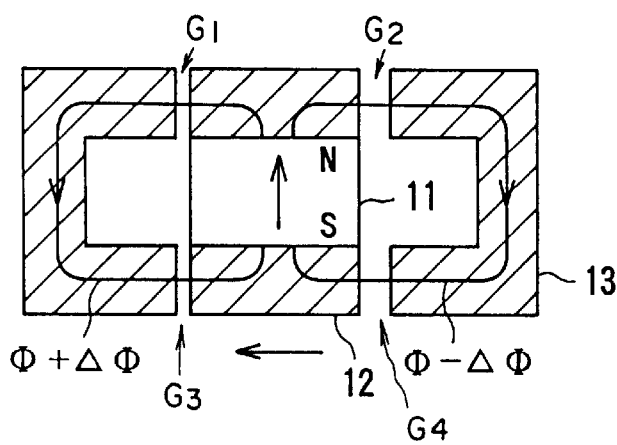
Figure 3E:
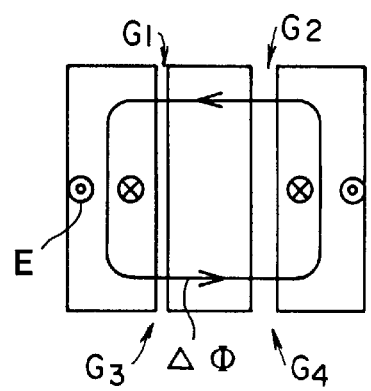
Figure 3C:
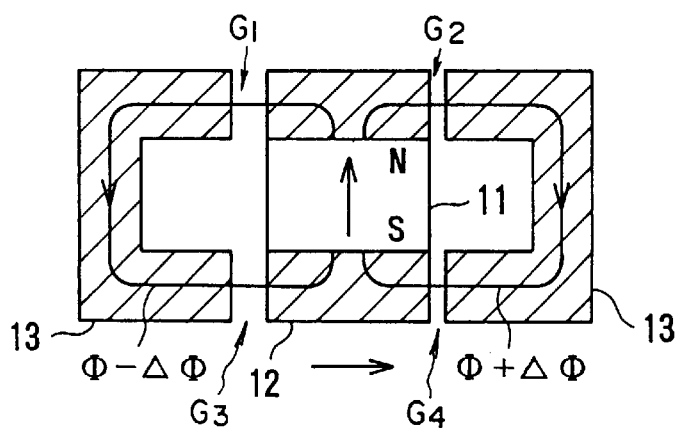

FIGS. 3(A)–3(F) show a damper device according to a first embodiment of the present invention. The damper device according to the first embodiment has a magnetic circuit for dividing a magnetic flux into two magnetic fluxes. As shown in FIGS. 3(A)–3(C), the damper device comprises a permanent magnet 11 in the form of a rectangular parallelepiped, a pair of magnetic poles 12 mounted on the permanent magnet 11, and a pair of C-shaped yokes 13 disposed on each side of the magnetic poles 12 with gaps $G_1$–$G_4$ defined therebetween. A magnetic flux generated by the permanent magnet 11 is divided into two magnetic fluxes flowing in the respective yokes 13.

Specifically, the permanent magnet 11 is magnetized as shown, and the magnetic poles 12 is fixedly mounted on respective opposite ends of the permanent magnet 11, the magnetic poles 12 being made of a magnetic material such as magnetic mild steel and providing N and S poles, respectively. The yokes 13 are spaced from the respective sides of the magnetic poles 12 across the gaps $G_1$–$G_4$. The yokes 13 are also made of a magnetic material such as magnetic mild steel. Since both the magnetic poles 12 and the yokes 13 are made of an electric conductor having a high permeability, the magnetic poles 12 and the yokes 13 serve as a path for an eddy current. A ring of copper may be fitted over each of the yokes 13 to provide a path for an eddy current.

Figure 3F:
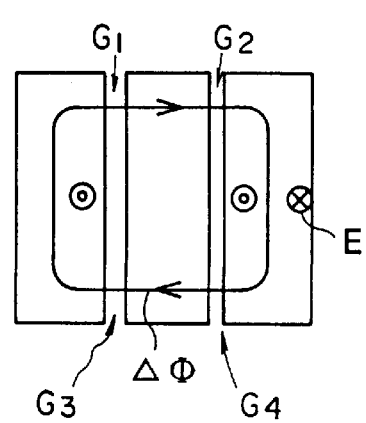

Division of a magnetic flux produced by the permanent magnet 11 will be described below. The permanent magnet 11 and the magnetic poles 12 are mounted on an object whose vibration is to be damped, and the yokes 13 are fixed to a stationary member near the object. When the permanent magnet 11 and the magnetic poles 12 are not vibrated, they are not displaced relatively to the yokes 13 as shown in FIG. 3(A), and a magnetic flux 2Φ from the permanent magnet 11 is divided into equal magnetic fluxes Φ that flow in the yokes 13. At this time, no circulatory magnetic flux flows in the magnetic poles 12 and the yokes 13 as shown in FIG. 3(D). It is assumed that the permanent magnet 11 and the magnetic poles 12 are vibrated in the directions indicated by the arrows in FIG. 3(A). When the permanent magnet 11 and the magnetic poles 12 are displaced to the left as shown in FIG. 3(B), reducing the left-hand gaps $G_1$–$G_3$ and increasing the right-hand gaps $G_2$–$G_4$, a magnetic flux $2\Phi$ from the permanent magnet 11 is divided into a magnetic flux $\Phi$–$\Delta\Phi$ that flows in the left-hand yoke 13 and a magnetic flux $\Phi$–$\Delta\Phi$ that flows in the right-hand yoke 13. At this time, a circulatory magnetic flux $\Delta\Phi$ flows counterclockwise in the magnetic poles 12 and the yokes 13 as shown in FIG. 3(E). When the permanent magnet 11 and the magnetic poles 12 are displaced to the right as shown in FIG. 3(C), increasing the left-hand gaps $G_1$, $G_3$ and reducing the right-hand gaps $G_2$, $G_4$, a magnetic flux $2\Phi$ from the permanent magnet 11 is divided into a magnetic flux $\Phi$–$\Delta\Phi$ that flows in the left-hand yoke 13 and a magnetic flux $\Phi$+$\Delta\Phi$ that flows in the right-hand yoke 13. At this time, a circulatory magnetic flux $\Delta\Phi$ flows clockwise in the magnetic poles 12 and the yokes 13 as shown in FIG. 3(E). FIGS. 3(E) and 3(F) also show electromotive forces E that are generated around the circulatory magnetic flux $\Delta\Phi$ in a direction to impede the change of the circulatory magnetic flux $\Delta\Phi$. Therefore, if the permanent magnet 11 and the magnetic poles 12 are vibrated with respect to the yokes 13, the circulatory magnetic flux $\Delta\Phi$ flows through a circulatory path defined by the magnetic poles 12 and the yokes 13, generating the electromotive forces E throughout the circulatory path around the circulatory magnetic flux $\Delta\Phi$.

If the gaps $G_1$–$G_4$ are small, then the damper device as an electric circuit has a large inductance and may have a reduced damper efficiency. In such a case, no ring of copper is required on the yokes 13, and the yokes 13 themselves are sufficient as members for producing eddy currents therein. Since the yokes 13 serve as members for producing eddy currents therein, they should preferably have a high permeability and a high conductivity, and an adequate thickness. Without any rings of copper, the yokes 13 are very simple in structure and material, and can be manufactured inexpensively.

The damper device according to the first embodiment has a negative stiffness to relative displacement because of the permanent magnet 11. Therefore, the damper device needs to be mechanically reinforced for stiffness such as by a metal spring or a viscoelastic film such as a rubber sheet placed in each of the gaps $G_1$–$G_4$.

In FIGS. 3(A)–3(C), the lower gaps $G_3$, $G_4$ may be eliminated, and the lower magnetic pole 12 may be coupled directly to the yokes 13, with the yokes 13 being reduced so as to be elastically deformable. However, such a modified damper device is less effective to damp vibration because the magnetic flux produced by the permanent magnet 11 is divided by the upper gaps S only. Alternatively, lower yoke arms may be coupled to the lower magnetic pole 12, with a gap being defined between the lower magnetic pole 12 and the permanent magnet 11. The gap may be filled with an elastic member for mechanically stabilizing the lower magnetic pole 12 and the permanent magnet 11. Even though the origin of relative positions of the lower magnetic pole 12 and the permanent magnet 11 may be shifted from their point of symmetry, no problem arises because the lower magnetic pole 12 and the permanent magnet 11 will vibrate about the shifted origin of relative positions.

2nd Embodiment

Figure 4:
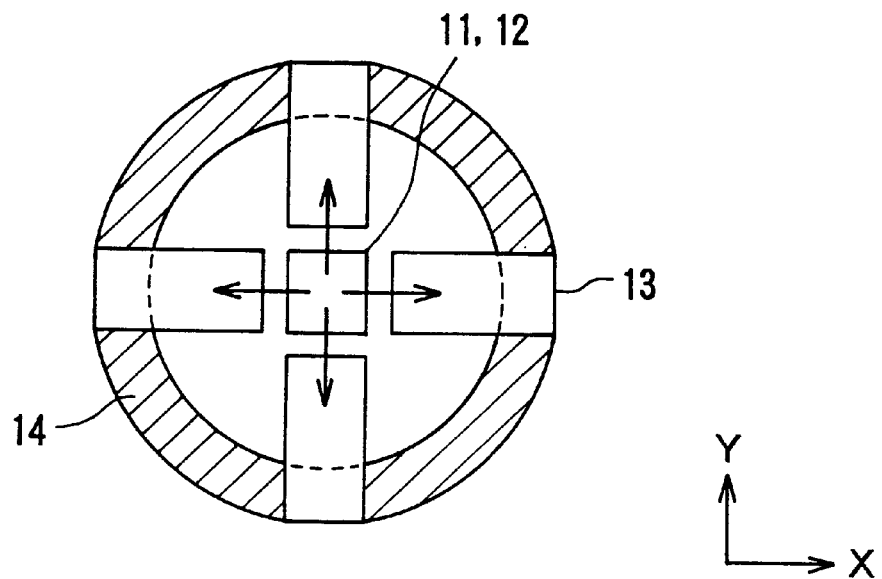
FIG. 4 is a cross-sectional view of a damper device according to a second embodiment of the present invention.

FIG. 4 shows a damper device according to a second embodiment of the present invention. The damper device according to the second embodiment has a magnetic circuit for dividing a magnetic flux into four magnetic fluxes. According to the second embodiment, the damper device comprises a permanent magnet 11, magnetic poles 12 mounted thereon, and four C-shaped yokes 13 disposed around the permanent magnet 11 and the magnetic poles 12.

The damper device according to the second embodiment serves to damp vibrations applied in two directions indicated by the arrows X, Y. The magnetic flux produced by the permanent magnet 11 is divided to flow into the right- and left-hand yokes 13 in X direction. Also, the magnetic flux produced by the permanent magnet 11 is divided to flow into the up- and down-side yokes in Y direction. Therefore, the magnetic flux produced by the permanent magnet 11 flows into the four yokes in two directions such as X and Y directions according to the second embodiment shown in FIG. 4. According to the second embodiment, therefore, vibrations of an object in two orthogonal directions, such as X and Y directions, can be damped using the single permanent magnet 11. As shown in FIG. 4, the four yokes 13 are firmly secured relatively to each other by a ring-shaped fixture 14.

The magnetic flux produced by the permanent magnet may be divided into three or five or more magnetic fluxes. For dividing the magnetic flux into more than two magnetic fluxes, a hollow spherical or cylindrical yoke may be employed, and a cylindrical permanent magnet and cylindrical magnetic poles may be inserted in a central cylindrical hole defined in the hollow spherical or cylindrical yoke. A mechanical spring mechanism is required to keep gaps between the yokes and the magnetic poles.

3rd Embodiment

Figures 5A, 5B:
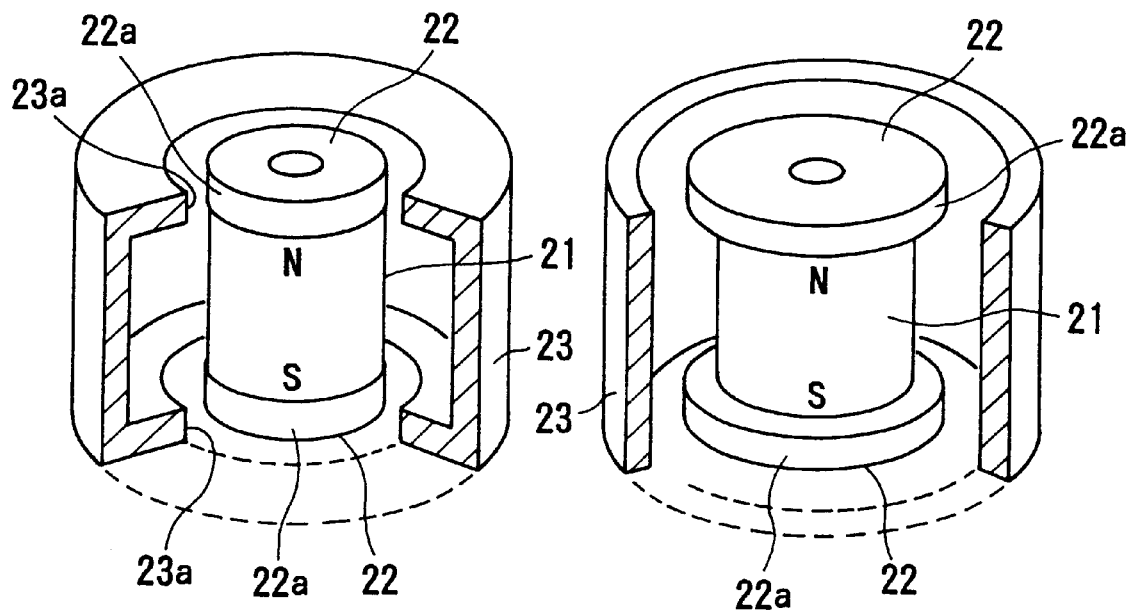
FIG. 5(A) is a perspective view, partly cut away, of a ring-shaped damper device according to a third embodiment of the present invention.
FIG. 5(B) is a perspective view, partly cut away, of a modification of the ring-shaped damper device shown in FIG. 5(A)

FIG. 5(A) shows a ring-shaped damper device according to a third embodiment of the present invention. The ring-shaped damper device according to the third embodiment serves to damp vibration applied in the radial direction. As shown in FIG. 5(A), the ring-shaped damper device comprises an axially magnetized cylindrical permanent magnet 21 with a central axial hole defined therein for insertion therein of a rotatable shaft, for example, whose vibration is to be damped. The ring-shaped damper device also has a pair of flat ring-shaped magnetic poles 22 mounted respectively on axially opposite ends of the permanent magnet 21. The magnetic poles 22 have outer circumferential surfaces (magnetic pole surfaces) 22a, which is the same surface with the outer cylindrical surface of the permanent magnet 21. The magnetic poles 22 are made of a magnetic material such as magnetic mild steel. The ring-shaped damper device further includes a cylindrical yoke 23 disposed around the permanent magnet 21 and the magnetic poles 22. The cylindrical yoke 23 is adapted to be fixed to a stationary member of rotary machinery. The cylindrical yoke 23 has radially inward upper and lower flanges having respective inner circumferential surfaces 23a disposed in radially confronting relation to the outer circumferential surfaces 22a of the magnetic poles 22 across gaps. Magnetic fluxes flow from the N pole of the permanent magnet 21 through the upper magnetic pole 22, the upper gap, the cylindrical yoke 23, the lower gap, and the lower magnetic pole 22 back into the S pole of the permanent magnet 21.

FIG. 5(B) shows a modification of the ring-shaped damper device shown in FIG. 5(A). In FIG. 5(B), magnetic poles 22 mounted on the axial ends of a permanent magnet 21 have respective outer circumferential surfaces (magnetic pole surfaces) 22a projecting radially outwardly beyond the outer cylindrical surface of the permanent magnet 21. The outer circumferential surfaces 22a face an inner circumferential surface of a cylindrical yoke 23 at its upper and lower ends.

Figure 6A:
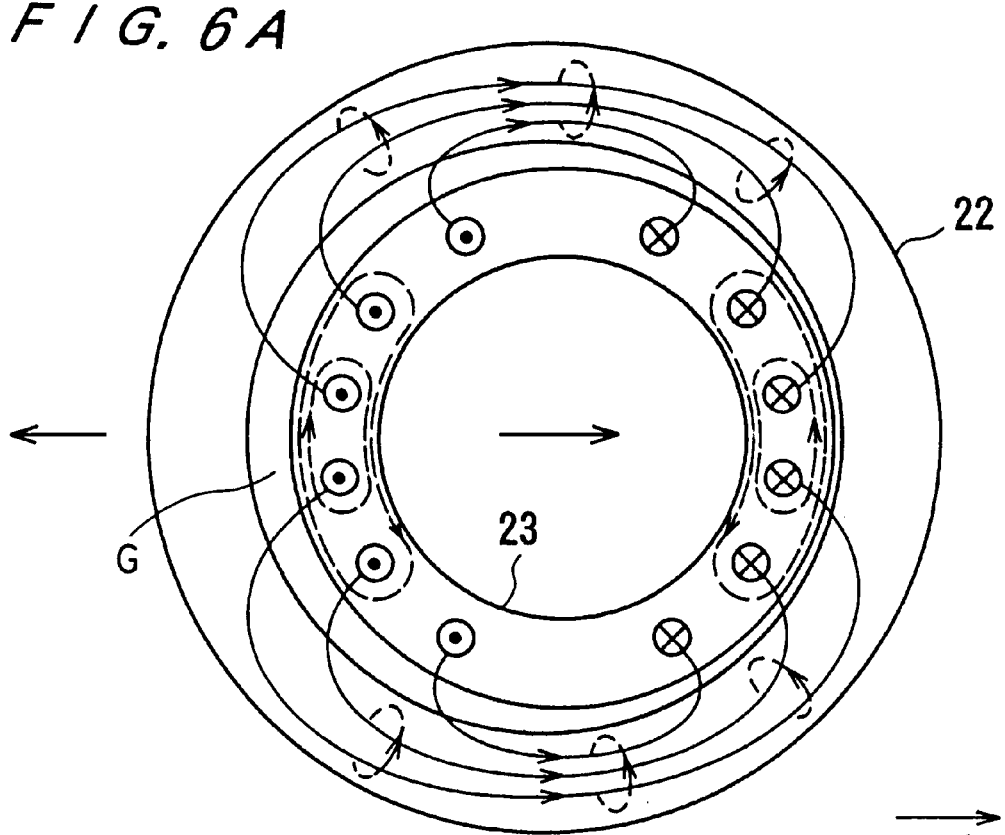
FIGS. 6(A) and 6(B) are cross-sectional views showing how magnetic fluxes change and eddy currents are generated in the ring-shaped damper device.
Figure 6B:
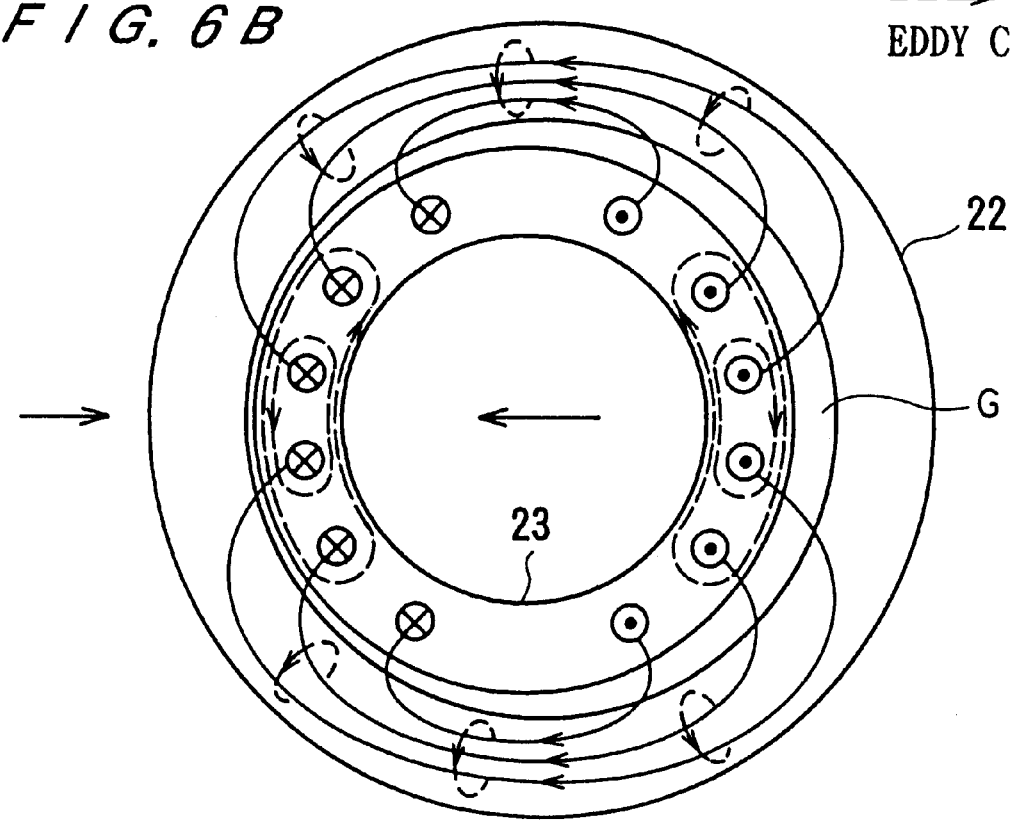

Magnetic fluxes flowing through the ring-shaped damper device shown in FIGS. 5(A) and 5(B) will be described below. FIGS. 6(A) and 6(B) show a ring-shaped damper device having an outer cylindrical permanent magnet 22 and an inner cylindrical yoke 23 disposed in the outer cylindrical permanent magnet 22 with a gap G defined therebetween. In FIG. 6(A), the outer cylindrical permanent magnet 22 is displaced to the left with respect to the inner cylindrical yoke 23. In FIG. 6(B), the outer cylindrical permanent magnet 22 is displaced to the right with respect to the inner cylindrical yoke 23. In FIGS. 6(A) and 6(B), magnetic flux changes ΔΦ are indicated by solid-line arrows, and eddy currents are indicated by dotted-line arrows. When the outer cylindrical permanent magnet 22 is not displaced with respect to, but positioned centrally in, the inner cylindrical yoke 23, the gap G is uniform in the full circumferential direction. Therefore, magnetic fluxes Φ from the outer cylindrical permanent magnet 22 flow into the inner cylindrical yoke 23 across shortest distances, and hence are axially symmetrical and distributed radially uniformly, then there is no circumferential flux flow. When the outer cylindrical permanent magnet 22 is displaced to the left with respect to the inner cylindrical yoke 23, as shown in FIG. 6(A), the gap G is wider in its left-hand side and narrower in its right-hand side. The flux density is maximum across the gap in its right-hand side. Since magnetic fluxes tend to concentrate near the gap in its right-hand side, the magnetic resistance near the gap in its right-hand side increases equivalently. Therefore, not all magnetic fluxes concentrate near the gap in its right-hand side, but magnetic fluxes are distributed along the entire circumference of the outer cylindrical permanent magnet 22 and the inner cylindrical yoke 23. FIG. 6(B) shows a reverse pattern of magnetic fluxes that flow when the outer cylindrical permanent magnet 22 is displaced to the right with respect to the inner cylindrical yoke 23.

Accordingly, when the outer cylindrical permanent magnet 22 is displaced to the left with respect to the inner cylindrical yoke, then magnetic fluxes are increased to Φ+ΔΦ in the right-hand of the inner cylindrical yoke 23, and decreased to Φ−ΔΦ in the left-hand of yoke 23. And, when the outer cylindrical permanent magnet 22 is displaced to the right with respect to the inner cylindrical yoke, then magnetic fluxes are increased to Φ+ΔΦ in the left-hand of the inner cylindrical yoke 23, and decreased to Φ−ΔΦ in the right-hand of yoke 23. At the result, change of magnetic fluxes ΔΦ flows only in the magnetic poles 22 and yoke 23 as shown in FIGS. 6A and 6B in accordance with the vibration in the direction of left and right.

The change ΔΦ of the magnetic fluxes which do not flow through the permanent magnet will be described below. In FIG. 6A, the magnetic flux change ΔΦ flows circulatorily in the closed loop as follows. It flows from the yoke 23 at its left-hand side to the magnetic pole 22 at its left-hand across the widened gap G, flows circumferentially in two paths along the ring-shaped magnetic pole 22 to the right-hand of the magnetic pole 22, flows to the yoke 23 at its right-hand across the narrow gap, flows axially in the downward direction to the downward yoke (not shown) at its right-hand, flows to the downward magnetic pole (not shown) across the marrow gap, flows circumferentially in two paths along the downward pole (not shown) to its left-hand, flows to the downward yoke (not shown) across the widened gap G, and flows axially in the upward direction to the yoke 23 at its left-hand (start position). In FIG. 6B, the magnetic flux change ΔΦ flows in the opposite direction of FIG. 6A as described above. The magnetic flux change ΔΦ is added to the uniformly distributed magnetic flux Φ, increasing the magnetic flux across the narrower gap. If the magnetic pole is not ring-shaped, the magnetic flux change ΔΦ flows back and forth through the magnetic poles, and is widely distributed within the yokes and the magnetic poles.

Therefore, large eddy currents are produced in the magnetic pole 22 and yoke 23 themselves, and eddy currents can easily flow in themselves.

4th Embodiment

Figure 7:
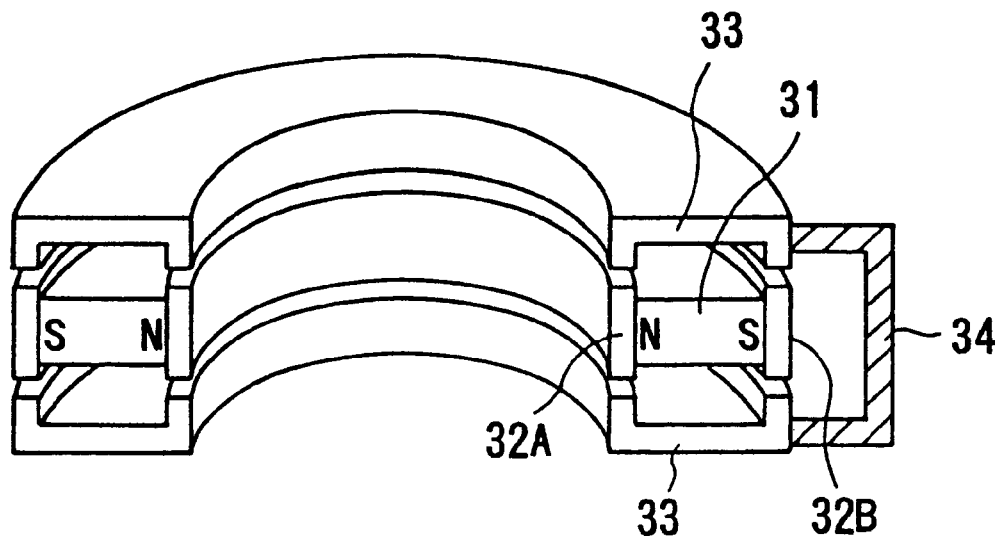
FIG. 7 is a perspective view, partly cut away, of a ring-shaped damper device according to a fourth embodiment of the present invention.

FIG. 7 shows a ring-shaped damper device according to a fourth embodiment of the present invention. According to the fourth embodiment, the ring-shaped damper device comprises an axial damper device having a radially magnetized ring-shaped permanent magnet. Specifically, the ring-shaped damper device has a flat ring-shaped permanent magnet 31, a pair of ring-shaped magnetic poles 32A, 32B mounted respectively on inner and outer circumferential surfaces of the ring-shaped permanent magnet 31, and a pair of upper and lower C-shaped annular yokes 33 having flanges facing the magnetic poles 32A, 32B. The upper and lower yokes 33 are fixed to each other by a physical joint 34, and hence mechanically integral with each other. A magnetic flux produced by the permanent magnet 31 flows from the N pole thereof radially inwardly into the magnetic pole 32A, flows axially across gaps into the yokes 33, then flows radially outwardly through the yokes 33, flows axially across gaps into the magnetic pole 32B, and then flows radially inwardly into the S pole of the permanent magnet 31. If either the permanent magnet 31 or the yokes 33 are fixed and the other movable, then when the movable member is axially vibrated, the gaps are varied, varying a change ΔΦ in the magnetic flux flowing through the yokes 33 and the magnetic poles 32A, 32B, so that eddy currents are generated in the yokes 33 and the magnetic poles 32A, 32B. The ring-shaped permanent magnet 31 need not be a unitary structure, but may comprise a plurality of magnet pieces interconnected at their poles. The permanent magnet 31 may not be of a circular shape, but may be of a planar looped shape such as a looped rectangular shape.

5th Embodiment

According to a fifth embodiment of the present invention, since magnetic attractive forces act between magnetic poles and yokes, a spring is employed to give stable stiffness to the magnetic poles and the yokes.

Figure 8:
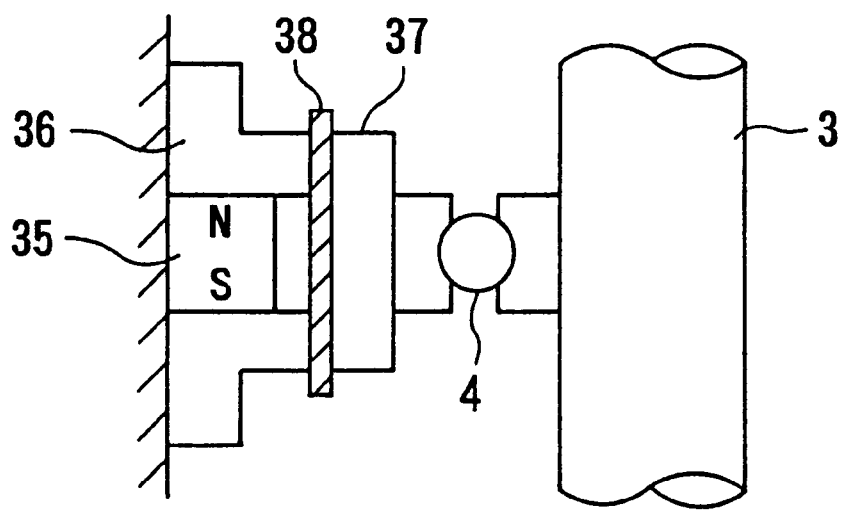
FIG. 8 is a fragmentary view of a ring-shaped damper device according to a fifth embodiment of the present invention.

FIG. 8 shows a ring-shaped damper device according to the fifth embodiment of the present invention. As shown in FIG. 8, the ring-shaped damper device is fitted over the outer race of a ball bearing 4 to absorb radial vibrations applied to a rotor 3 which is mounted in the inner race of the ball bearing 4. The ring-shaped damper device comprises a ring-shaped permanent magnet 35 fixed to a stationary member and a ring-shaped yoke 37 disposed radially inwardly of the permanent magnet 35. Ring-shaped magnetic poles 36 are mounted on respective axial ends of the permanent magnet 35. An elastic film 38 is interposed as a mechanical spring in a gap between the magnetic poles 36 and the yoke 37.

According to a modification, the inner race of the ball bearing 4 may be fitted over a ring-shaped yoke, as shown in FIGS. 5(A) and 5(B). The ring-shaped yoke may preferably be mounted on a vibrating member if the ball bearing should not be magnetized by the permanent magnet.

6th Embodiment

Figure 9A:
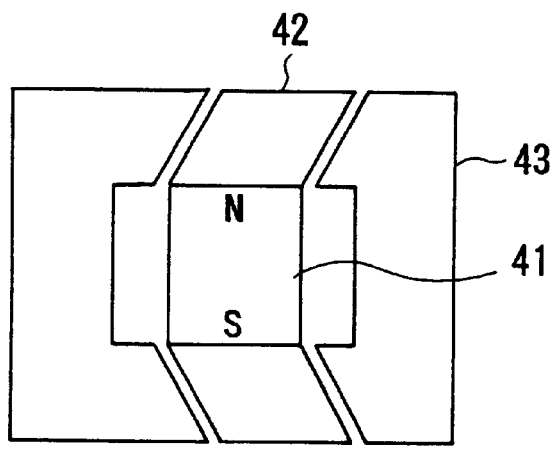
FIGS. 9(A) and 9(B) are cross-sectional views of a three-axis damper device according to a sixth embodiment of the present invention.
Figure 9B:
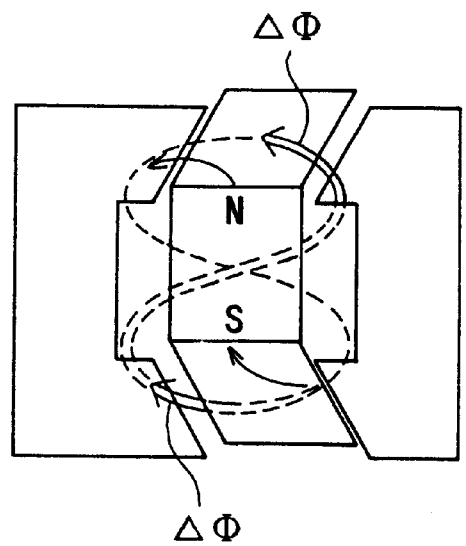

FIGS. 9(A) and 9(B) show a three-axis damper device according to a sixth embodiment of the present invention. According to the sixth embodiment, the three-axis damper device has a single permanent magnet 41, magnetic poles 42 mounted respectively on opposite ends of the permanent magnet 41, and yokes 43 facing the magnetic poles 42 across slanted gaps. While the slanted gaps somewhat reduce the efficiency of the damper device, the slanted gaps make the damper device effective to damp vibrations in three directions with the single permanent magnet 41. As shown in FIG. 9(B), when the magnetic poles 42 are vertically displaced relatively to the yokes 43, the magnetic flux generated by the permanent magnet 41 is divided into magnetic fluxes across diagonal gaps, and a magnetic flux change ΔΦ flows along a 8-shaped circulatory path outside of the permanent magnet 41 as indicated by the double-line arrows, so that the arrayed arrangement has no effect on horizontal movement of the magnetic poles 42 relative to the yokes 43.

Figure 10:
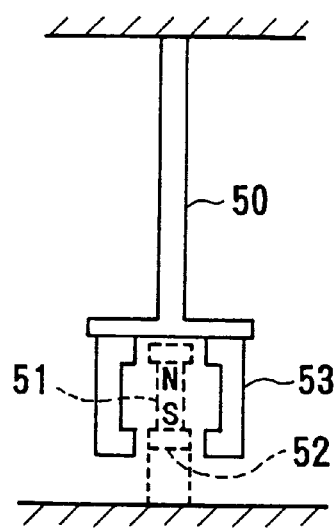
FIG. 10 is a schematic view of first and second experimental damper devices.

A vibration damping effect of a damper device according to the present invention based on the principles of the present invention will be described below. FIG. 10 schematically shows first and second experimental damper devices used in an experiment for the vibration damping effect. Each of the first and second experimental damper devices comprised a vertical cantilevered plate 50 of stainless steel having an upper end fixed to a stationary member and a pair of C-shaped yokes 53 mounted on a lower free end of the vertical cantilevered plate 50. The first experimental damper device also had a permanent magnet 51 and magnetic poles 52 which are disposed between the yokes 53, as shown in FIGS. 3(A)–3(C). The second experimental damper device lacked the permanent magnet 51 and the magnetic poles 52. In the first and second experimental damper devices, the vertical cantilevered plate 50 exhibited mechanical recovery stiffness and served as a spring element which vibrates.

Figure 11:
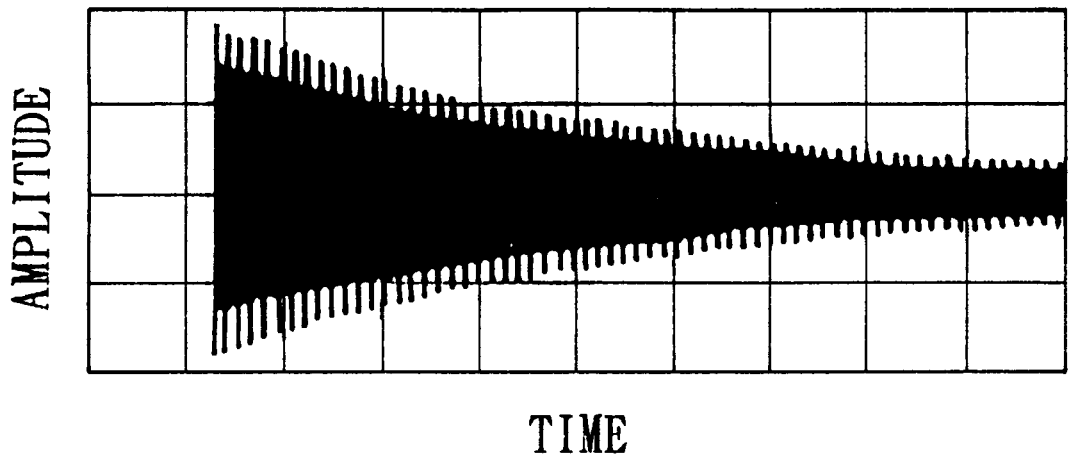
FIG. 11 is a diagram showing a vibration waveform of a leaf spring which is not combined with any damper device.

When the second experimental damper device was vibrated by an external hit by impulse hammer applied thereto, vibrations of the yokes 53 were detected by a gap sensor (not shown). FIG. 11 shows the amplitude of the detected vibrations as it varied with time. It can be seen from FIG. 11 that the vibrations were poorly damped and the damping ratio ζ was about 0.0015.

Figure 12:
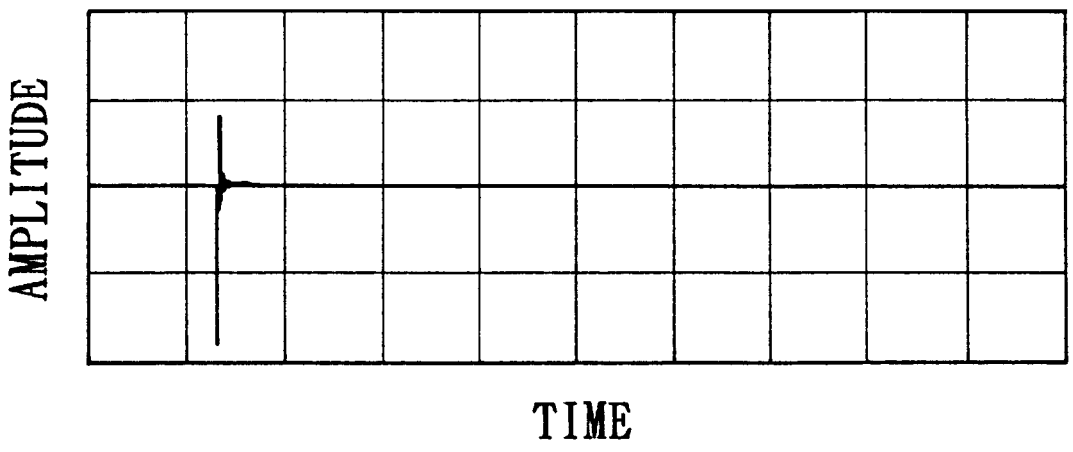
FIG. 12 is a diagram showing a vibration waveform of a leaf spring which is combined with a damper device according to the present invention.

When the first experimental damper device was vibrated by an external hit by impulse hammer applied thereto, vibrations of the yokes 53 were detected by a gap sensor (not shown). FIG. 12 shows the amplitude of the detected vibrations as it varied with time. The damping ratio ζ was about 0.5.

In the experiment, no ring of copper was used around each of the yokes 53 for the reasons that if a ring of copper were disposed around each of the yokes 53, the self inductance of the damper device as a current circuit would be too large, causing eddy currents to suffer a phase delay which would impair the damping effect.

The experimental results indicate that the damper device should not employ copper members, an observation which is different from the common knowledge about damper devices. It follows that the damper device can be highly simplified in structure.

In order to reduce the size and weight of a damper device, it is necessary to optimize a magnetic circuit thereof, i.e., to reduce the amount and hence weight of a magnetic material used. It has been found that the damping efficiency per cross-sectional area $\pi a^2$ where a is effective radius of a magnetic flux path depends on a skin depth δ that is related to a frequency ω to be damped, a permeability $\mu$, and a conductivity κ. The skin depth δ is expressed by the following equation:

$$\delta = \sqrt{2/(\omega \mu \kappa)}$$

Figure 13:
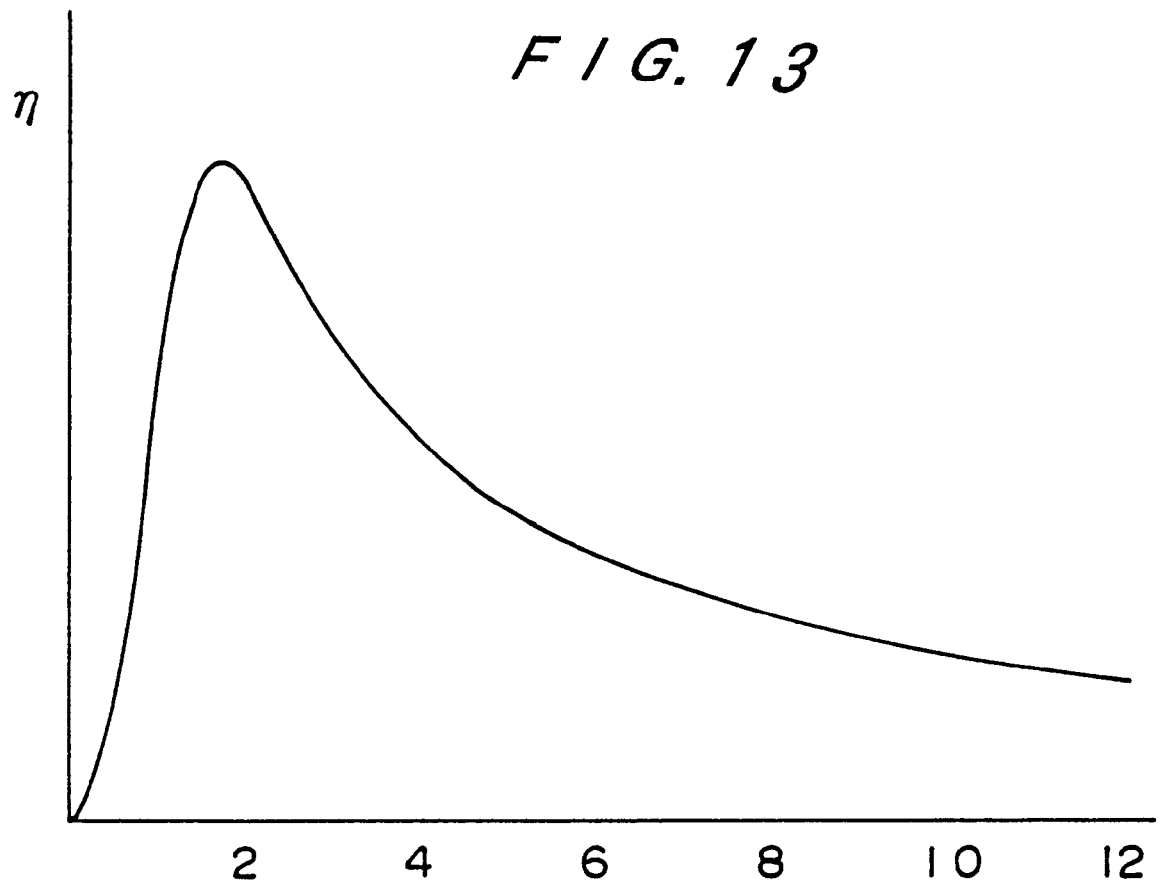
FIG. 13 is a diagram showing the relationship between the skin depth and the damping efficiency per cross-sectional area.

The relationship between the ratio a/δ and the damping efficiency η per circular cross-sectional area of the magnetic flux path is shown in FIG. 13. As can be understood from FIG. 13, the damping efficiency η has a peak value when the ratio a/δ of the radius a of the magnetic flux path to the skin depth δ is about 1.8. If the magnetic flux path has a rectangular cross-sectional shape, then the damping efficiency η per rectangular cross-sectional area with respect to the ratio of the thickness d of the magnetic flux path to the skin depth δ is plotted by a curve similar to the curve shown in FIG. 13, and the damping efficiency η has a peak value when the ratio d/δ is about 2.3. Irrespective whether the magnetic flux path has a circular cross-sectional shape or a rectangular cross-sectional shape, the magnetic flux which is phased most effectively for vibration damping passes through an internal region which is spaced from an outer surface of the magnetic flux path by a distance that is slightly greater than the skin depth δ. Therefore, the length of the magnetic flux path near the internal region is increased. Stated otherwise, it is basically important to increase a peripheral length of the magnetic flux path while keeping the thickness of the cross-sectional shape about twice the skin depth δ. If the thickness of the cross-sectional shape of the magnetic flux path is much greater than the skin depth δ, then it is effective to provide a plurality of regions having dimensions whose ratio produces a damping efficiency peak value and electrically insulate and position the regions parallel to each other within the magnetic circuit. Inasmuch as a damping force is proportional to the square of the flux density, the magnetomotive force of the permanent magnet needs to match the damping force. If the total cross-sectional area increases, then the magnetomotive force, i.e., the amount of magnet, also increases.

If a magnetic flux path has a rectangular cross-sectional shape, one side of which has a length that is 4.6 times the skin depth, then a damping efficiency peak value is obtained by arranging the magnetic flux path in the form of two plates each having a thickness that is 2.3 times the skin depth, and the damping efficiency is twice its peak value because of the two plates.

7th Embodiment

Figure 14:
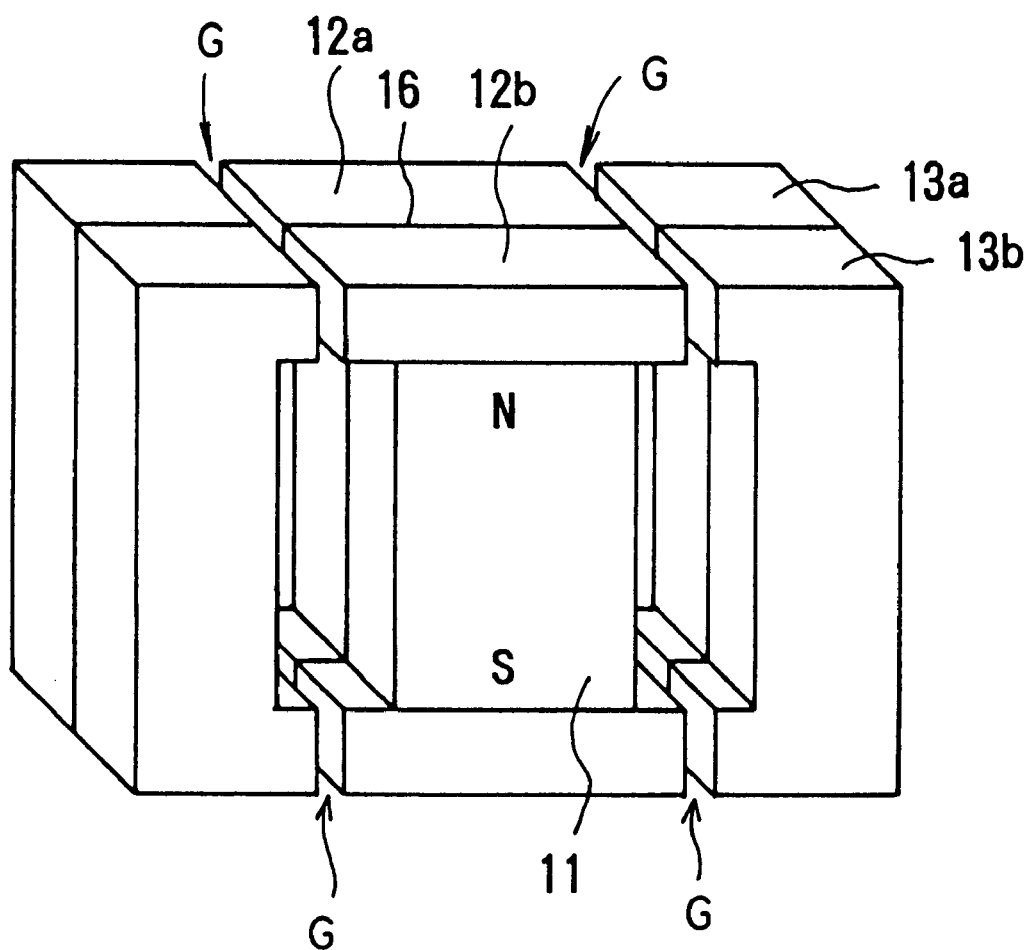
FIG. 14 is a perspective view of a damper device having a plurality of electrically insulated magnetic circuits according to a seventh embodiment of the present invention.

FIG. 14 shows a damper device having such a plurality of electrically insulated magnetic circuits according to a seventh embodiment of the present invention. In FIG. 14, two parallel magnetic poles 12a, 12b are mounted on each of the opposite ends of a permanent magnet 11, and two C-shaped yokes 13a, 13b are disposed in confronting relation to the magnetic poles 12a, 12b across a gap G on each side of the permanent magnet 11, thereby providing two magnetic circuits. The magnetic poles 12a, 12b are electrically insulated from each other, and the yokes 13a, 13b are also electrically insulated from each other. The cross-sectional area of each of the magnetic poles 12a, 12b, each in the form of a rectangular parallelepiped, is selected to provide a damping efficiency peak value, and a damping force is increased twice without changing the magnetomotive force, the flux density, and the overall amount of material of the yokes and the magnetic poles.

The yokes and the magnetic poles should preferably be made of a magnetic material having a high permeability and a high conductivity, e.g., magnetic mild steel or pure iron. Since such a magnetic material usually exhibits hysteresis, it produces a hysteresis loss as well as an eddy current loss when an alternating magnetic flux passes therethrough. When the magnetic flux is divided as the magnetic material is vibrated, the paths and directions of the magnetic flux change, causing the vibration energy as a hysteresis loss. The yokes and the magnetic poles arranged according to the present invention eliminate a neck for the alternating magnetic flux, they can effectively produce a hysteresis loss as well as an eddy current loss.

Figure 15:
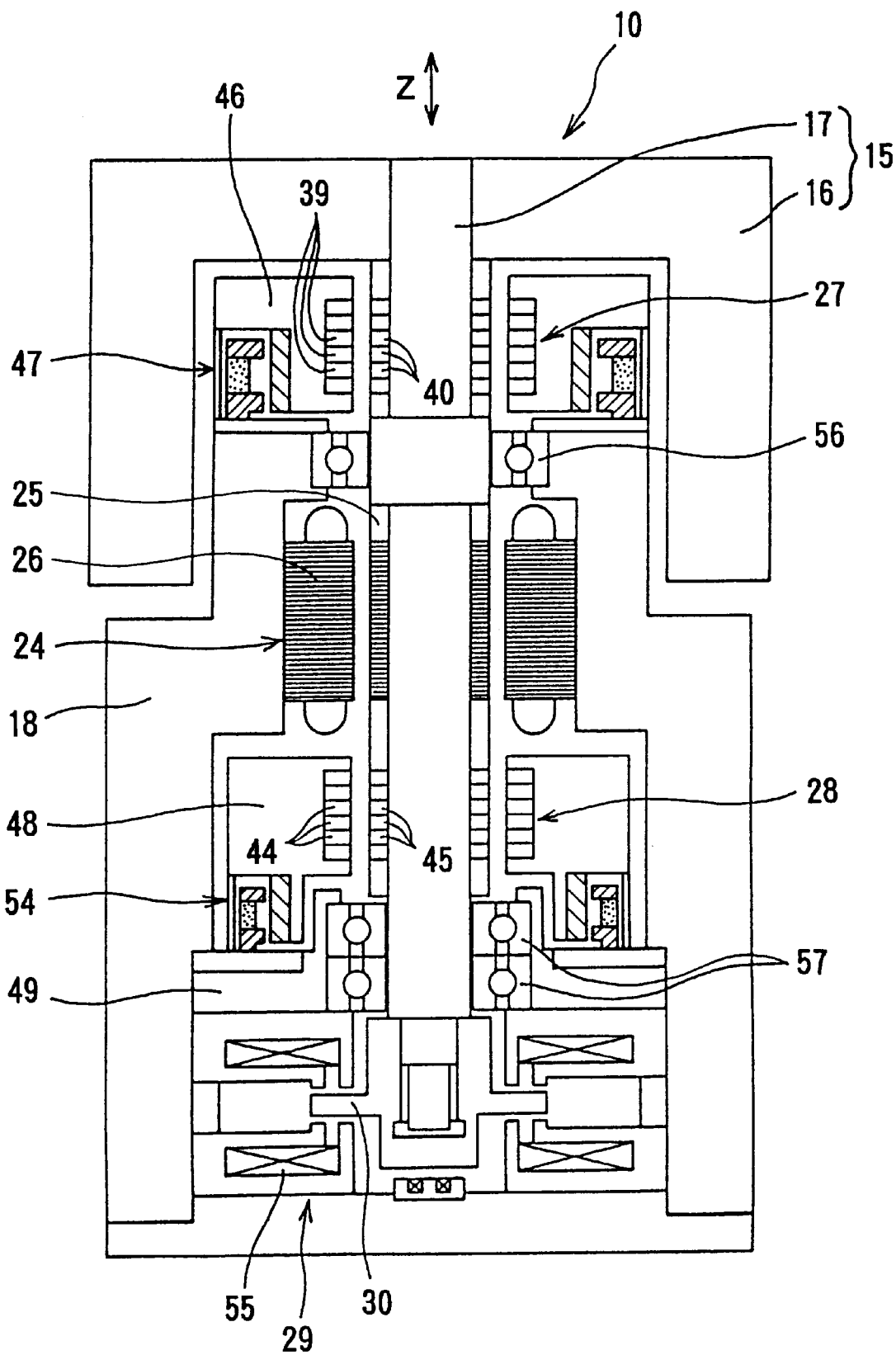
FIG. 15 is an axial cross-sectional view of a turbomolecular pump according to the present invention.

FIG. 15 shows a turbomolecular pump 10 according to the present invention. As shown in FIG. 15, the turbomolecular pump 10 has a rotary assembly 15 comprising blades 16 and a rotatable shaft 17, a fixed frame 18 which is stationary with respect to the rotary assembly 15, and a motor 24 having a rotor 25 fixedly mounted on the rotatable shaft 17 and a stator 26 fixedly mounted on the fixed frame 18. The rotatable shaft 17 is rotatably supported radially by passive radial magnetic bearings 27, 28 at upper and lower positions, and axially by an active magnetic bearing 29 at a lower end of the rotatable shaft 17 which has a detachable thrust disk 30.

The passive radial magnetic bearing 27 has a plurality of outer and inner ring-shaped permanent magnets 39, 40 that confront each other across a gap. Those ring-shaped permanent magnets 39, 40 that confront each other have like polarities to exert repelling magnetic forces. Similarly, the passive radial magnetic bearing 28 has a plurality of outer and inner ring-shaped permanent magnets 44, 45 that confront each other across a gap. Those ring-shaped permanent magnets 44, 45 that confront each other have like polarities to exert repelling magnetic forces. The rotatable shaft 17 is thus positioned substantially centrally within the outer ring-shaped permanent magnets 39, 44.

The outer ring-shaped permanent magnets 39 are held by a permanent magnet holder 46 which is mounted on the fixed frame 18 by an eddy current damper device 47. Likewise, the outer ring-shaped permanent magnets 44 are held by a permanent magnet holder 48 which is mounted on a base 49 on the fixed frame 18 by an eddy current damper device 54. The permanent magnet holders 46, 48 which hold the respective outer ring-shaped permanent magnets 39, 44 are axially immovably, but radially movably, mounted on the fixed frame 18 and the base 49, respectively, by the eddy current damper devices 47, 54.

The active magnetic bearing 29 includes a solenoid 55 positioned in axially sandwiching relation to the thrust disk 30 and secured to the fixed frame 18. The solenoid 55 is supplied with an energizing current from a control system (not shown). When the solenoid 55 is energized by a supplied current, the active magnetic bearing 29 keeps the thrust disk 30 and hence the rotatable shaft 17 levitated axially.

The rotatable shaft 17 is also rotatably supported by an upper emergency ball bearing 56 positioned beneath the passive radial magnetic bearing 27, and lower emergency ball bearings 57 positioned beneath the passive radial magnetic bearing 28.

8th Embodiment

Figure 16:
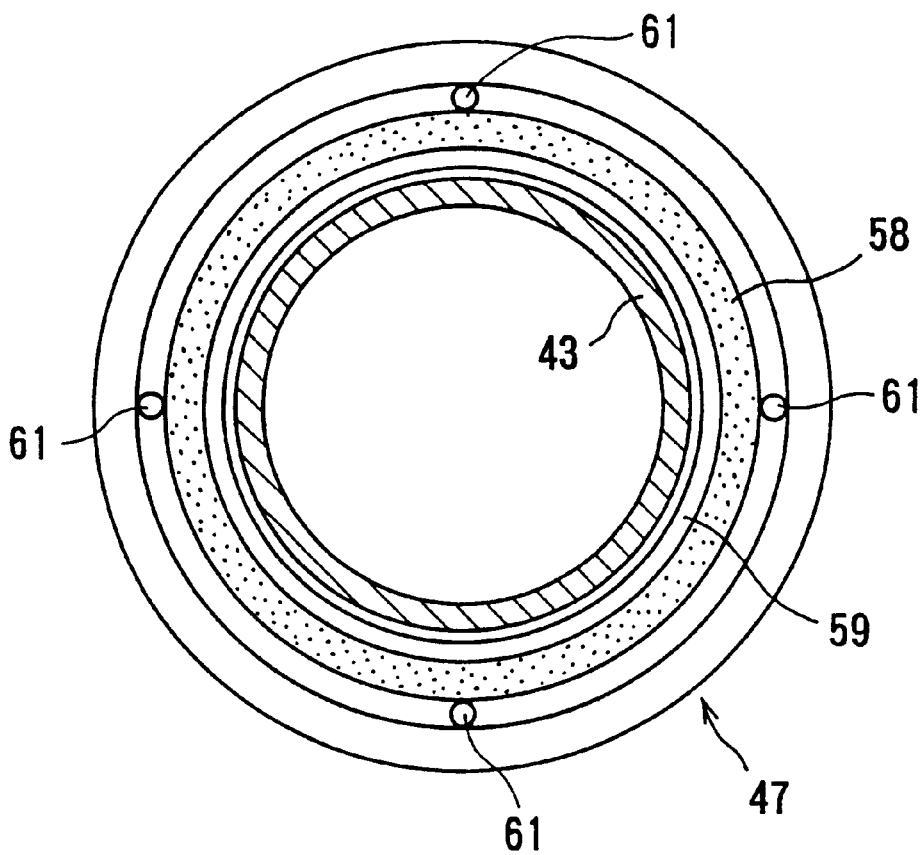
FIG. 16 is a plan view of an eddy current damper device according to an eighth embodiment of the present invention which is incorporated in the turbomolecular pump shown in FIG. 15.
Figure 17:
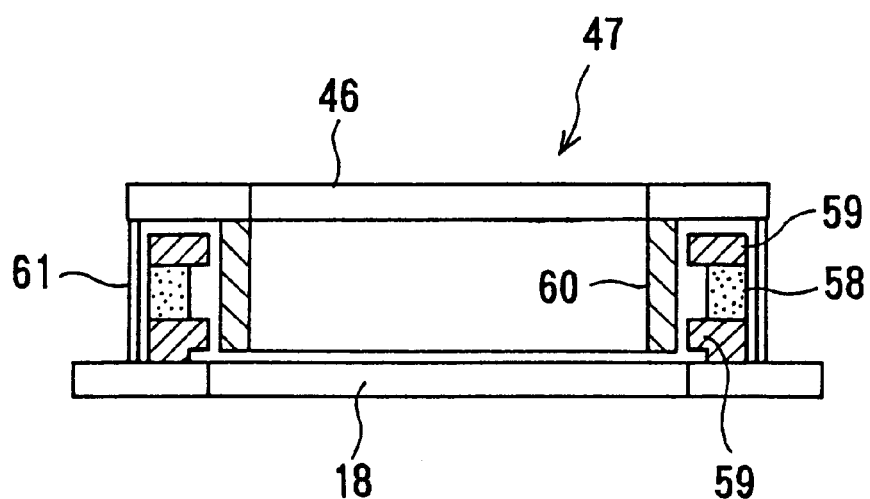
FIG. 17 is a cross-sectional view of the eddy current damper device shown in FIG. 16.

FIGS. 16 and 17 show the eddy current damper device 47 in detail. As shown in FIGS. 16 and 17, the eddy current damper device 47 comprises a cylindrical permanent magnet 58, a pair of flat ring-shaped magnetic poles 59 mounted respectively on axially opposite ends of the cylindrical permanent magnet 58, one of the ring-shaped magnetic poles 59 being fixed to the fixed frame 18, and a cylindrical yoke 60 fixed to the permanent magnet holder 46. The cylindrical permanent magnet 58 and the ring-shaped magnetic poles 59 are fixed to each other, providing a C-shaped cross section. The ring-shaped magnetic poles 59 have radially inner surfaces facing an outer circumferential surface of the cylindrical yoke 60 across a gap. The permanent magnet holder 46 and the fixed frame 18 are connected to each other by four angularly spaced springs 61, which axially immovably, but radially movably, hold the permanent magnet holder 46.

The eddy current damper device 54 which is interposed between the permanent magnet holder 48 and the base 49 is essentially identical in structure to the eddy current damper device 47. The eddy current damper device 54 has upper and lower surfaces mounted respectively on the permanent magnet holder 48 and the fixed frame 49.

Figure 18:
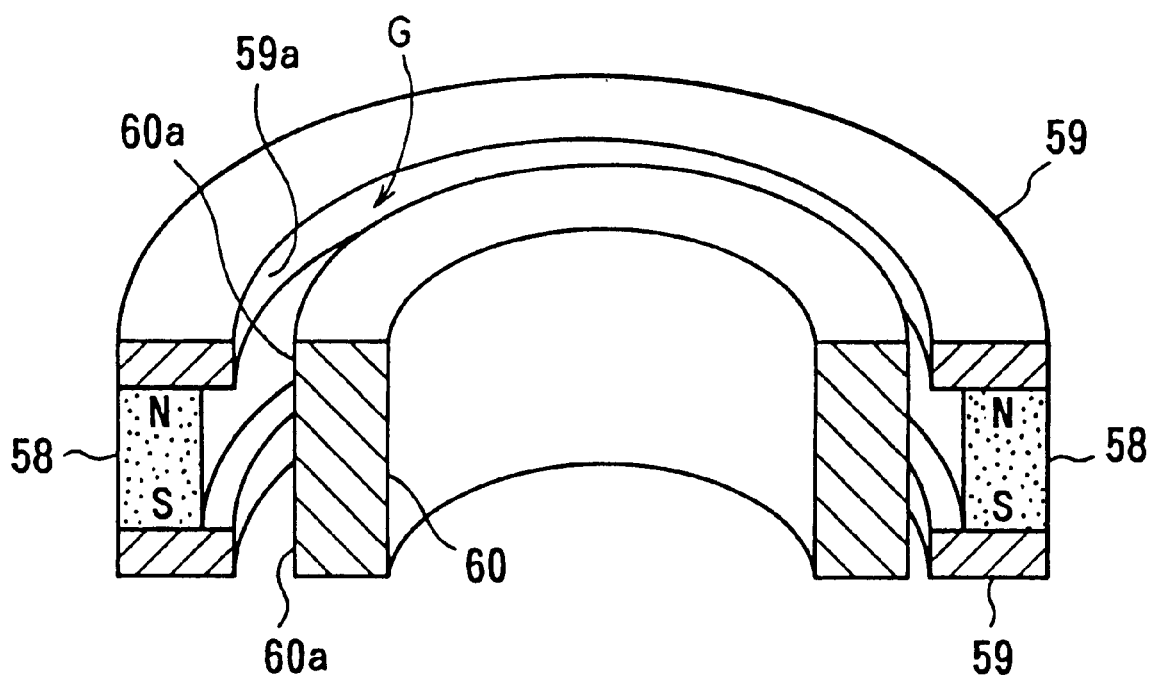
FIG. 18 is a perspective view, partly cut away, of the eddy current damper device shown in FIG. 16.
Figure 19:
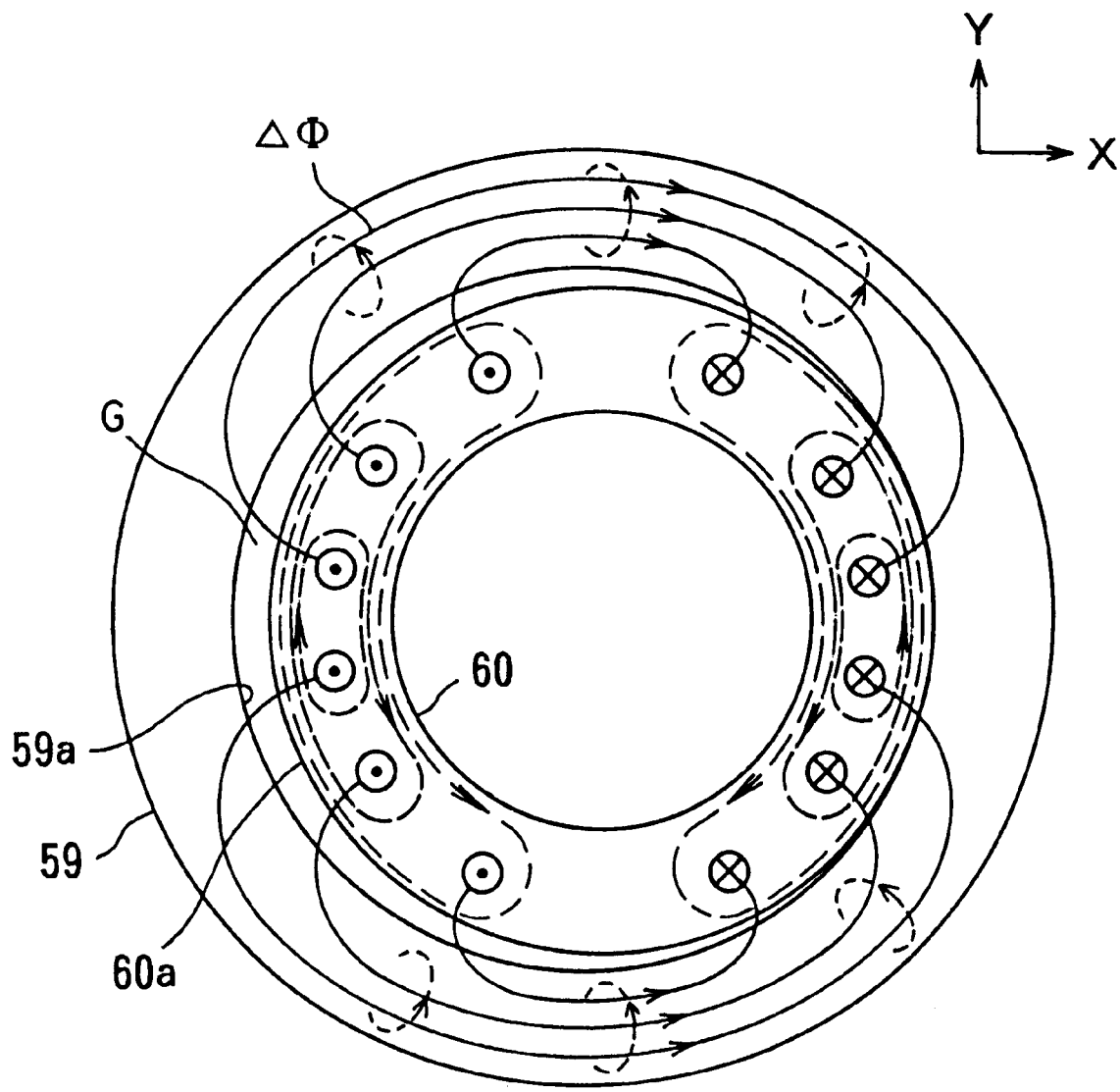
FIG. 19 is a cross-sectional view showing the manner in which magnetic fluxes flow into the eddy current damper device shown in FIG. 16.

FIGS. 18 and 19 show structural details of the eddy current damper device 47 and the manner in which the eddy current damper device 47 operates. The magnetic poles 59 are mounted on the respective axially opposite ends of the cylindrical permanent magnet 58 which is axially magnetized. The cylindrical yoke 60 is disposed in radially confronting relation to inner circumferential surfaces (magnetic pole surfaces) 59a of the magnetic poles 59. The cylindrical yoke 60 is fixed to the permanent magnet holder 46 which holds the outer ring-shaped permanent magnets 39 (see FIG. 15). The cylindrical permanent magnet 58 and the magnetic poles 59 are fixedly mounted on the fixed frame 18. The inner circumferential surfaces 59a of the magnetic poles 59 face an outer circumferential surface 60a of the cylindrical yoke 60 across a gap G. A magnetic circuit is provided which extends from the N pole of the cylindrical permanent magnet 58 through one of the magnetic poles 59, the gap G, the cylindrical yoke 60, the gap G, and the other magnetic pole 59 back to the S pole of the cylindrical permanent magnet 58.

The magnetic poles 59 and the cylindrical yoke 60 are made of a magnetic material such as magnetic mild steel having a relatively low electric resistance. When the cylindrical yoke 60 is vibrated with respect to the magnetic poles 59, eddy currents are produced in the magnetic poles 59 and the cylindrical yoke 60, converting the vibration energy into thermal energy.

FIG. 19 shows magnetic flux changes $\Delta\Phi$ that flow in the magnetic poles 59 when the cylindrical yoke 60 is radially displaced to the right with respect to the magnetic poles 59. If the cylindrical yoke 60 is not displaced, but positioned centrally in the magnetic poles 59, then the gap G is uniform in the full circumferential direction. Therefore, magnetic fluxes $\Phi$ from the cylindrical permanent magnet 58 flow into the cylindrical yoke 60 across shortest distances and back to the cylindrical permanent magnet 58, and hence are axially symmetrical and distributed radially uniformly. In other words, there is no circumferential flow of $\Delta\Phi$. When the cylindrical yoke 60 is displaced to the right, the gap G is wider in its left-hand side and narrower in its right-hand side. The flux density is maximum across the gap in its right-hand side. Since magnetic fluxes tend to concentrate near the gap in its right-hand side, the magnetic resistance near the gap in its right-hand side increases equivalently. Therefore, not all magnetic fluxes concentrate near the gap in its right-hand side, but magnetic fluxes are distributed according to a smooth gradient pattern along the entire circumference of the cylindrical permanent magnet 58 and the cylindrical yoke 60. According to the gradient pattern, the flux density is maximum at its right-hand end and minimum at its left-hand end. The gradient pattern indicates that the flux density in the gap represents the sum of the uniform magnetic flux $\Phi$ and changes $\Delta\Phi$. However, as to the magnet 58, it produces uniform magnetic flux $\Phi$ at any of the circumferential portion thereof. Accordingly the change of magnetic flux $\Delta\Phi$ flows circulatorily in the magnetic pole 59 and axially in the yoke 60 out of the magnet 58.

When the cylindrical yoke 60 is moved to the right as shown in FIG. 19, magnetic flux change $\Delta\Phi$ flows downwardly in a right-hand side of the cylindrical yoke 60, flows across the narrow gap to the right-hand magnetic pole (not shown), flows circumferentially in two paths along the ring shaped magnetic pole (not shown) to the left-hand, flows across the widened gap to the left-hand of the yoke (not shown), and upwardly in a left-hand side of the cylindrical yoke 60. The magnetic flux change ΔΦ then flows from the outer circumferential surface 60a of the cylindrical yoke 60 at its upper portion across the gap G into the outer circumferential surface 59a of the upper magnetic pole 59 to the left-hand, flows circumferentially in the upper magnetic pole 59 to the right-hand, flows from the upper magnetic pole 59 across the narrow gap into the cylindrical yoke 60, and flows axially in the cylindrical yoke 60. When the cylindrical yoke 60 is moved to the left, magnetic flux change ΔΦ flows in the opposite direction. Therefore, when the magnetic flux change ΔΦ is generated at the time when the cylindrical yoke 60 is vibrated in the direction indicated by the arrow X, eddy currents are generated in a direction to impede the magnetic flux change ΔΦ. If the magnetic flux changes ΔΦ increase in the magnetic pole 59 and the cylindrical yoke 60, they produce eddy currents in directions shown in FIG. 19. Similarly, magnetic flux change ΔΦ produced when the cylindrical yoke 60 is vibrated in the direction indicated by the arrow Y produce eddy currents in right- and left-hand portions of the magnetic pole 59 and also in upper and lower portions of the cylindrical yoke 60.

The ring-shaped eddy current damper device is not limited to the structure shown in FIGS. 16–19, but may be of any of various other structures. For example, the cylindrical yoke 60 may be positioned radially outwardly of the cylindrical permanent magnet 58 insofar as a magnetic flux produced by the cylindrical permanent magnet 58 as the rotatable shaft is vibrates flows into different regions of the magnetic poles 59 and the cylindrical yoke 60, generating eddy currents in the magnetic poles 59 and the cylindrical yoke 60.

9th Embodiment

Figure 20A:
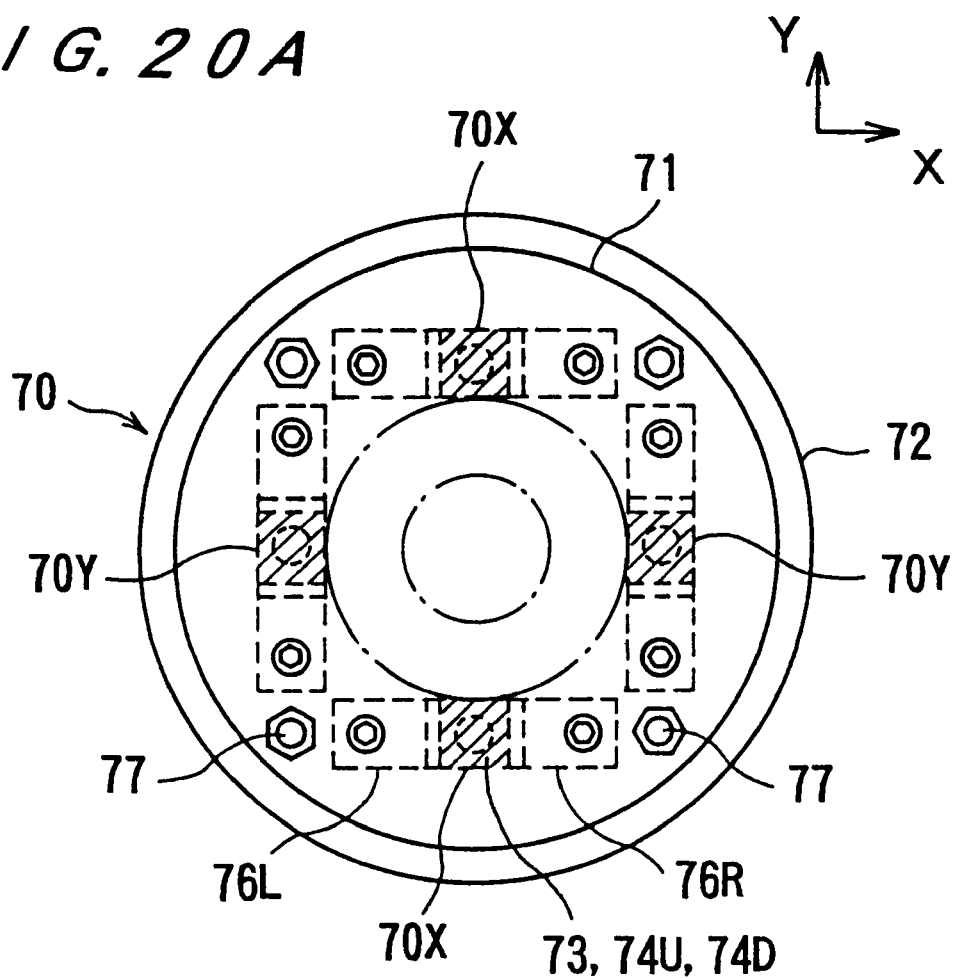
FIG. 20(A) is a plan view of an eddy current damper device according to a ninth embodiment of the present invention.
Figure 20B:
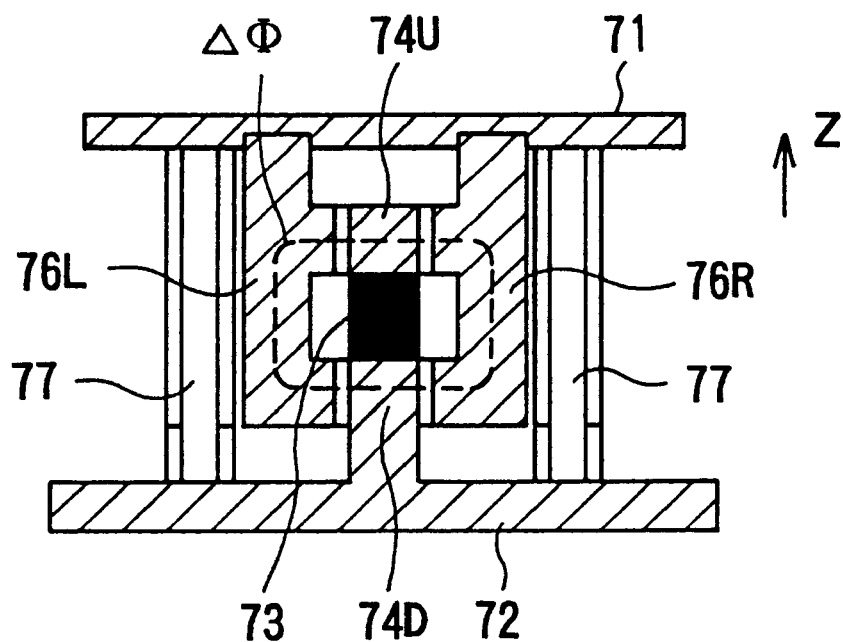
FIG. 20(B) is a cross-sectional view of the eddy current damper device shown in FIG. 20(A).

FIGS. 20(A) and 20(B) show an eddy current damper device 70 according to a ninth embodiment of the present invention. As shown in FIGS. 20(A) and 20(B), the eddy current damper device 70 is a linearly movable damper device and comprises a fixed member 72 and a movable member 71 secured to the fixed member 72 by springs 77. The movable member 71 is immovable in the direction indicated by the arrow Z with respect to the fixed member 72, but movable in the X-Y plane due to the elasticity of the springs 77. The eddy current damper device 70 has four unit eddy current dampers 70X, 70Y which are spaced from each other. Each of the unit eddy current dampers 70X comprises a permanent magnet 73 and two magnetic poles 74U, 74D mounted respectively on upper and lower ends of the permanent magnet 73, the permanent magnet 73 and the magnetic poles 74U, 74D being fixedly mounted on the fixed member 72, and two yokes 76L, 76R fixedly mounted on the movable member 71 and facing the magnetic poles 74U, 74D across gaps. When the gaps on the opposite sides of the magnetic poles 74U, 74D are equal to each other, a magnetic flux Φ produced by the permanent magnet 73 is divided into equal magnetic fluxes that flow into the yokes 76L, 76R. When the movable member 71 is displaced to the right in FIGS. 20(A) and 20(B), a magnetic flux Φ produced by the permanent magnet 73 is divided into a greater magnetic flux that flows into the right-hand yoke 76R and a smaller magnetic flux that flows into the left-hand yoke 76L. When the movable member 71 is displaced to the left in FIGS. 20(A) and 20(B), a magnetic flux Φ produced by the permanent magnet 73 is divided into a greater magnetic flux that flows into the left-hand yoke 76L and a smaller magnetic flux that flows into the right-hand yoke 76R. When the movable member 71 is vibrated in the direction indicated by the arrow X, magnetic flux change ΔΦ flows in a closed loop from the magnetic pole 74U through the yoke 76R (76L) and the magnetic pole 74D, to the yoke 76L (76R), without passing through the permanent magnet 73. The magnetic flux change ΔΦ thus flowing produce eddy currents in the yokes 76L, 76R and the magnetic poles 74U, 74D, and the eddy currents are consumed by a resistance loss, so that the vibration energy is converted into thermal energy. Accordingly, the vibration of the permanent magnet holder fixed to the movable member 71 is absorbed, thus absorbing the vibration of the rotatable shaft that is supported by the magnetic bearings.

The eddy current damper device 70 includes a pair of unit eddy current dampers 70X spaced from and confronting each other in the direction indicated by the arrow Y, and another pair of unit eddy current dampers 70Y spaced from and confronting each other in the direction indicated by the arrow X, as shown in FIG. 20(A). The unit eddy current dampers 70X serve to damp the vibration of the movable member 71 in the direction component indicated by the arrow X, and the unit eddy current dampers 70Y serve to damp the vibration of the movable member 71 in the direction component indicated by the arrow Y. The unit eddy current dampers 70X, 70Y divide magnetic fluxes generated by the permanent magnets into two directions, i.e., left- and right-hand directions. Alternatively, in each of the unit eddy current dampers, a permanent magnet in the form of a rectangular parallelepiped may be surrounded by four yokes for dividing a magnetic flux generated by the permanent magnet into four directions.

The eddy current damper device is less subjected to aging than rubber dampers because the eddy current damper device comprises permanent magnets, magnetic poles, and yokes. The eddy current damper device is also less susceptible to temperature-dependent changes and hence is capable of providing stabler stiffness and damping effect regardless of temperature variations. Because the eddy current damper device is able to sufficiently damp vibrations in a full range of rotational speeds of the rotational shaft even when the vibration mode of the rotatable shaft varies, the turbomolecular pump which incorporates the eddy current damper device is highly stable.

Although certain preferred embodiments of the present invention have been shown and described in detail, it should be understood that various changes and modifications may be made therein without departing from the scope of the appended claims.

What is claimed is:

1. A damper device comprising:

a magnet having magnetic poles;

at least two yokes facing said magnetic poles of said magnet across gaps;

said magnet and said at least two yokes jointly providing a magnetic flux circuit such that a magnetic flux flowing from a first magnetic pole of said magnet is divided across one of said gaps into magnetic fluxes which flow into entrance sides of said yokes and back from exit sides of said yokes across another of said gaps into a second magnetic pole of said magnet;

said at least two yokes being mechanically connected rigidly to each other; and spring means elastically holding said gaps between said magnetic pole and said sides of said yokes; one of said magnet and said yokes being adapted to be connected to a vibratable member;

whereby when said gaps are differentially varied in length by vibration of said vibratable member, the divided magnetic fluxes are changed to generate eddy currents in said yokes and said magnetic poles.

2. A damper device comprising:

a ring-shaped magnet magnetized in an axial direction thereof;

a pair of ring-shaped magnetic poles disposed on respective opposite ends of said ring-shaped magnet;

a ring-shaped yoke disposed either within or around said ring-shaped magnet with a ring-shaped gap interposed therebetween, said ring-shaped yoke magnetically connecting said ring-shaped magnetic poles to each other; and spring means elastically holding said ring-shaped gap; one of said ring-shaped magnet and said ring-shaped yoke being adapted to be connected to a vibratable member, wherein, whenever said one of said ring-shaped magnet and said ring-shaped yoke is caused to vibrate by said vibratable member, said ring-shaped gap is circumferentially varied in length to produce a change in a path of a magnetic flux to generate eddy currents in said yoke and said magnetic poles, and wherein at least one of said pair of magnetic poles and said ring-shaped yoke includes projections extending toward the other to narrow said ring-shaped gap.

3. A damper device comprising:

a ring-shaped magnet magnetized radially transversely to an axial direction thereof;

a pair of ring-shaped magnetic poles disposed on respective opposite ends of said ring-shaped magnet;

a pair of ring-shaped yokes disposed in sandwiching relation to said ring-shaped magnet with a pair of respective ring-shaped gaps interposed therebetween, said ring-shaped yokes magnetically connecting said ring-shaped magnetic poles to each other;

said ring-shaped magnet, said ring-shaped magnetic poles, and said ring-shaped yokes jointly providing a magnetic circuit such that a magnetic flux flowing from an N pole of said ring-shaped magnet through one of said magnetic poles is divided across said gaps into magnetic fluxes which flow into entrance sides of said yokes and back from exit sides of said yokes across said gaps into an S pole of said magnet through the other of said magnetic poles;

said ring-shaped yokes being connected rigidly to each other; and spring means elastically holding said ring-shaped gaps; one of said ring-shaped magnet and said ring-shaped yokes being adapted to be connected to a vibratable member which is vibratable in said axial direction, whereby when said ring-shaped gaps are differentially varied in length by vibration of said vibratable member, the divided magnetic fluxes are changed to generate eddy currents in said yokes and said magnetic poles.

4. A damper device comprising:

a magnet;

a pair of magnetic poles fixed to said magnet; and at least one yoke having surfaces spaced from and facing said magnetic poles, wherein said magnet, said magnetic poles, and said yoke are arranged so as to jointly form a looped magnetic flux circuit such that a magnetic flux produced by said magnet flows from one of said magnetic poles into said yoke, flows through said yoke, flows from said yoke into the other of said magnetic poles, and flows back into said magnet, wherein a change of the magnetic flux caused by a vibration-dependent change in the distance between said magnetic poles and said yoke causes eddy current loss therein, and said changed portion of said magnetic flux flows in said magnetic poles and said yoke outside of said magnet, and wherein at least one of said pair of magnetic poles and said at least one yoke includes projections extending toward the other to narrow a distance between them.

5. A damper device according to claim 4, wherein one of said at least one yoke and said magnet is mounted in a fixed position, and the other of said at least one yoke and said magnet is mounted in a vibratable member facing said fixed position, so that said distance is elastically held by stable spring characteristics thereof.

6. A damper device according to claim 4, wherein one of said magnetic pole and said yoke has one of a cylindrical shape and a planar shape and comprises one of a single member and a plurality of electrically insulated, parallel members.

7. A turbomolecular pump comprising:

a rotatable body having a plurality of impeller blades;

a rotor portion of a motor mounted on said rotatable body, said rotatable body being supported on a stationary body by bearings; and a damper device having a fixed member fixed to a stationary member, and a movable member fixed to a body for supporting said rotatable body, wherein one of said fixed member and said movable member comprises a permanent magnet and magnetic poles mounted thereon, and the other of said fixed member and said movable member comprises a yoke, and wherein rotation of said rotatable body produces radial vibration in said movable member, which causes a magnetic flux to be produced by said permanent magnet to generate eddy current loss in said yokes and magnetic poles.

8. A turbomolecular pump according to claim 7, wherein said bearings include radial passive magnetic bearings each having permanent magnets, and at least one of said passive magnetic bearings includes said damper device for damping radial vibration of said rotatable body.

9. A turbomolecular pump according to claim 7, said damper device further comprising:

a magnet;

a pair of magnetic poles fixed to said magnet; and at least a yoke having surfaces spaced from and facing said magnetic poles, said magnet, said magnetic poles, and said yokes jointly providing a looped magnetic flux circuit such that a magnetic flux produced by said magnet flows from one of said magnetic poles into said yoke, flows through said yoke, flows from said yoke into the other of said magnetic poles, and flows back into said magnet, wherein a change of the magnetic flux caused by a vibration-dependent change in a distance between said magnetic poles and said yoke causes eddy current loss therein, and said changed portion of said magnetic flux flows in said magnetic poles and said yoke outside of said magnet.

10. A turbomolecular pump according to claim 9, wherein said magnet is cylindrically-shaped.

* * * * *